US010678907B2

(12) United States Patent
Aditham et al.

(10) Patent No.: US 10,678,907 B2
(45) Date of Patent: Jun. 9, 2020

(54) DETECTING THREATS IN BIG DATA PLATFORMS BASED ON CALL TRACE AND MEMORY ACCESS PATTERNS

(71) Applicants: Santosh K. Aditham, Mountain View, CA (US); Nagarajan Ranganathan, Tampa, FL (US)

(72) Inventors: Santosh K. Aditham, Mountain View, CA (US); Nagarajan Ranganathan, Tampa, FL (US)

(73) Assignee: University of South Florida, Tampa, FL (US)

( * ) Notice: Subject to any disclaimer, the term of this patent is extended or adjusted under 35 U.S.C. 154(b) by 193 days.

(21) Appl. No.: 15/881,020

(22) Filed: Jan. 26, 2018

(65) Prior Publication Data

US 2018/0211033 A1 Jul. 26, 2018

Related U.S. Application Data

(60) Provisional application No. 62/450,637, filed on Jan. 26, 2017.

(51) Int. Cl.
*G06F 21/52* (2013.01)
*G06F 21/57* (2013.01)
*G06F 21/55* (2013.01)
*G06F 21/31* (2013.01)

(52) U.S. Cl.
CPC ............ *G06F 21/52* (2013.01); *G06F 21/316* (2013.01); *G06F 21/552* (2013.01); *G06F 21/57* (2013.01); *G06F 2221/034* (2013.01)

(58) Field of Classification Search
None
See application file for complete search history.

(56) References Cited

U.S. PATENT DOCUMENTS

| 6,735,703 | B1 * | 5/2004 | Kilpatrick | G06F 21/53 |
| | | | | 713/151 |
| 6,742,124 | B1 * | 5/2004 | Kilpatrick | G06F 21/316 |
| | | | | 713/194 |
| 8,873,747 | B2 | 10/2014 | Polzin et al. | |
| 10,430,586 | B1 * | 10/2019 | Paithane | G06F 3/062 |
| 2004/0205474 | A1 * | 10/2004 | Eskin | H04L 63/1416 |
| | | | | 713/188 |

(Continued)

OTHER PUBLICATIONS

Aditham, Santosh, Nagarajan Ranganathan, and Srinivas Katkoori. "Call Trace and Memory Access Pattern based Runtime Insider Threat Detection for Big Data Platforms." arXiv preprint arXiv:1611.07392 (2016).

(Continued)

*Primary Examiner* — Kaveh Abrishamkar
(74) *Attorney, Agent, or Firm* — Thomas | Horstemeyer, LLP

(57) ABSTRACT

A runtime attack can be detected on a big data system while processes are executed on various computing devices. A behavior profile can be maintained for tasks or processes running on different computing devices. The existence of a call variance in one of the traces for one of the behavior profiles can be determined. A memory variance can also be detected in one of the behavior profiles. A runtime attack has occurred when both the memory variance and the call variance are determined to exist.

20 Claims, 19 Drawing Sheets

(56) References Cited

U.S. PATENT DOCUMENTS

| | | | | |
|---|---|---|---|---|
| 2008/0077767 A1* | 3/2008 | Khosravi | ............ | G06F 12/1408 |
| | | | | 711/216 |
| 2010/0125913 A1* | 5/2010 | Davenport | .............. | G06F 21/54 |
| | | | | 726/25 |
| 2017/0169223 A1* | 6/2017 | Lin | ........................... | G06F 8/53 |

OTHER PUBLICATIONS

Abadi et al., "Control-flow integrity." Proceedings of the 12th ACM conference on Computer and communications security. ACM, 2005.

Aditham, Santosh and Ranganathan, Nagarajan, "A novel control-flow based intrusion detection technique for big data systems" WorldComp ABDA, 2016, pp. 45-51.

Aditham, Santosh and Ranganathan, Nagarajan, "A novel framework for mitigating insider attacks in big data systems." Big Data (Big Data), 2015 IEEE International Conference on. IEEE, 2015.

Aditham, Santosh and Ranganathan, Nagarajan, "A system architecture for the detection of insider attacks in big data systems." IEEE Transactions on Dependable and Secure Computing (2017).

Aditham, Santosh and Ranganathan, Nagarajan and Katkoori, Srinivas, "Memory access pattern based insider threat detection in big data systems." 2016 IEEE International Conference on Big Data (Big Data). IEEE, 2016.

Barham, Paul et al., "Magpie: Online Modelling and Performance-aware Systems." HotOS 2003, pp. 85-90.

Dimitrov, Martin et al., "Memory system characterization of big data workloads." Big Data, 2013 IEEE International Conference on. IEEE, 2013, pp. 15-22.

Erlingsson, Ulfar et a l., "Fay: extensible distributed tracing from kernels to clusters." ACM Transactions on Computer Systems (TOCS) 30.4 (2012): 13.

Eskin, Eleazar et al., "Modeling system calls for intrusion detection with dynamic window sizes." DARPA Information Survivability Conference & Exposition II, 2001. DISCEX'01. Proceedings. vol. 1. IEEE, 2001.

Fonseca, Rogrigo et al., "X-trace: A pervasive network tracing framework." Proceedings of the 4th USENIX conference on Networked systems design & implementation. USENIX Association, 2007.

Guo, Zhenyu et al., "G2: A graph processing system for diagnosing distributed systems." (2011).

Heba, F. Eid et al., "Principle components analysis and support vector machine based intrusion detection system." Intelligent Systems Design and Applications (ISDA), 2010 10th International Conference on. IEEE, 2010.

Hofmeyr, Steven A. et al., "Intrusion detection using sequences of system calls." Journal of computer security 6.3 (1998): 151-180.

Liao, Cong et al., "Towards provenance-based anomaly detection in MapReduce." Cluster, Cloud and Grid Computing (CCGrid), 2015 15th IEEE/ACM International Symposium on. IEEE, 2015.

Ma, Chuan et al., "An Anomalous Behavior Detection Method Using System Call Sequences for Distributed Applications." KSII Transactions on Internet & Information Systems 9.2 (2015).

Mace, Jonathan et al., "Pivot tracing: Dynamic causal monitoring for distributed systems." Proceedings of the 25th Symposium on Operating Systems Principles. ACM, 2015.

Mace, Jonathan et al., "Retro: Targeted Resource Management in Multi-tenant Distributed Systems." NSDI. 2015.

Mutz, Darren et al., "Anomalous system call detection." ACM Transactions on Information and System Security (TISSEC) 9.1 (2006): 61-93.

Ongaro, Diego et al., "In search of an understandable consensus algorithm." USENIX Annual Technical Conference. 2014.

Pichan, Ameer et al., "Cloud forensics: Technical challenges, solutions and comparative analysis." Digital Investigation 13 (2015): 38-57.

Serebryany, Konstantin et al., "A Fast Address Sanity Checker." USENIX Annual Technical Conference. 2012.

Sundarajan, Sudharsan et al., "Preventing Insider attacks in the Cloud." International Conference on Advances in Computing and Communications. Springer, Berlin, Heidelberg, 2011.

Warrender, Christina et al., "Detecting intrusions using system calls: Alternative data models." (1999): 133-145.

Wei, Wei et al., "Exploring opportunities for non-volatile memories in big data applications." Workshop on Big Data Benchmarks, Performance Optimization, and Emerging Hardware. Springer, Cham, 2014.

Zaharia, Matei et al., "Spark: Cluster computing with working sets." HotCloud 10.10-10 (2010): 95.

Zuech, Richard et al., "Intrusion detection and big heterogeneous data: a survey." Journal of Big Data 2.1 (2015): 3.

Wikibon, "Big Data Vendor Revenue and Market Forecast, 2013-2017", http://wikibon.org/wiki/v/Big_Data_Vendor_Revenue_and_Market_Forecast_2013-2017, accessed: Sep. 13, 2016.

Linux Programmer's Manual, http://man7.org/linus/man-pages/man2/ syscalls.2.html, accessed: Oct. 13, 2016.

Shlens, Jonathon, "A tutorial on principal component analysis." arXiv preprint arXiv:1404.1100 (2014).

* cited by examiner

DETECTING THREATS IN BIG DATA PLATFORMS BASED ON CALL TRACE AND MEMORY ACCESS PATTERNS

CROSS-REFERENCE TO RELATED APPLICATIONS

This application claims the benefit of U.S. Provisional Application No. 62/450,637, filed Jan. 26, 2017, the entire contents of which is hereby incorporated herein by reference.

BACKGROUND

The big data universe is growing aggressively with an estimated market of 50 billion dollars by next year. Big data platforms such as Hadoop and Spark are being widely adopted both by academia and industry. The end users have to trust the providers of big data platforms that host their data. Such trust is built on an underlying assumption that the platforms or their security methods will never be compromised; however, unexpected issues such as insider attacks or control-flow attacks due to programmer errors can happen in any system anytime.

Insider attacks (in an organization) typically deal with an employee stealing data using USB drives or by masquerading as another employee to gain access to unauthorized data. Such attacks can be hard to detect and almost impossible to prevent, but with the increase in popularity of concepts such as differential privacy in the big data universe, the biggest concern for these platforms is data loss or data theft; hence they need to be able to identify an attack on the data as soon as it happens.

BRIEF DESCRIPTION OF THE DRAWINGS

For a more complete understanding of the embodiments and the advantages thereof, reference is now made to the following description, in conjunction with the accompanying figures briefly described as follows.

Figure 1:
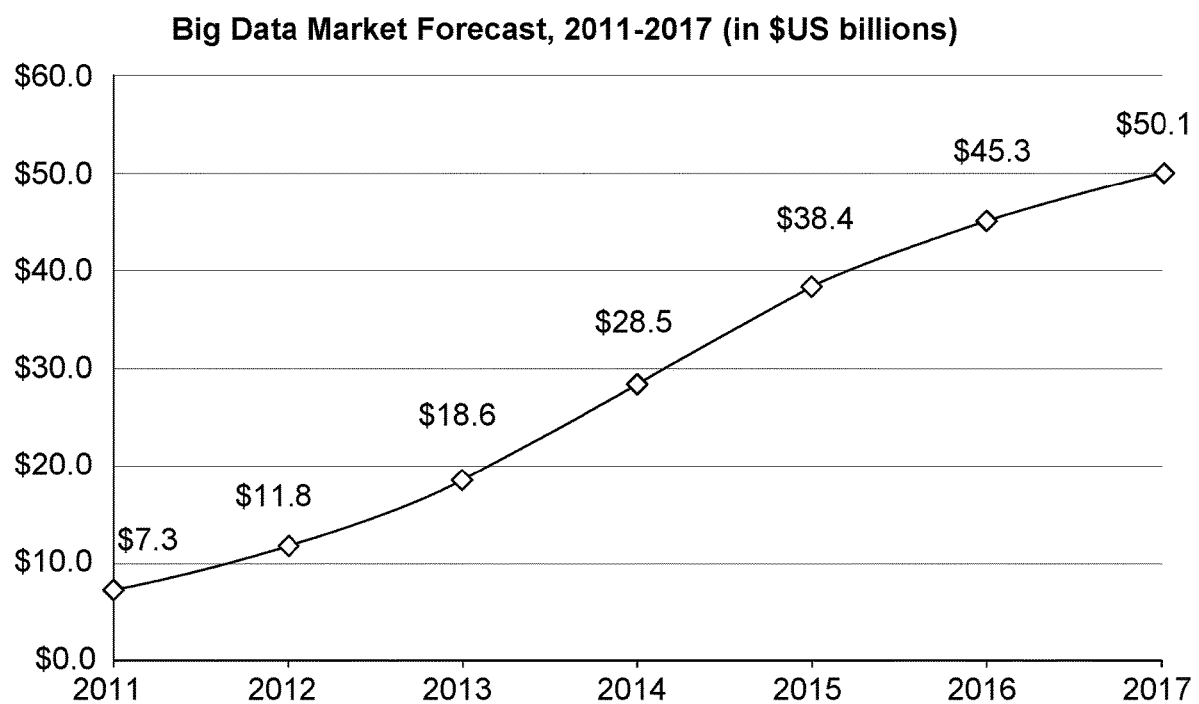
FIG. 1 illustrates an example big data market forecast according to various example embodiments.

The drawings illustrate only example embodiments and are therefore not to be considered limiting of the scope described herein, as other equally effective embodiments are within the scope and spirit of this disclosure. The elements and features shown in the drawings are not necessarily drawn to scale, emphasis instead being placed upon clearly illustrating the principles of the embodiments. Additionally, certain dimensions may be exaggerated to help visually convey certain principles. In the drawings, similar reference numerals between figures designate like or corresponding, but not necessarily the same, elements.

DETAILED DESCRIPTION

In the following paragraphs, the embodiments are described in further detail by way of example with reference to the attached drawings. In the description, well known components, methods, and/or processing techniques are omitted or briefly described so as not to obscure the embodiments. As used herein, the "present disclosure" refers to any one of the embodiments of the disclosure described herein and any equivalents. Furthermore, reference to various feature(s) of the "present disclosure" is not to suggest that all embodiments must include the referenced feature(s).

Turning now to the drawings, exemplary embodiments are described in detail. Big data platforms such as Hadoop and Spark are being widely adopted both by academia and industry. A runtime intrusion detection technique can be used that understands and works according to the properties of such distributed compute platforms. The technique can be based on runtime analysis of system and library calls and memory access patterns of tasks running on the datanodes (slaves). First, the primary datanode of a big data system creates a behavior profile for every task it executes. A behavior profile can include (a) trace of the system & library calls made and (b) sequence representing the sizes of private and shared memory accesses made during task execution. Then, the process behavior profile can be shared with other replica datanodes that are scheduled to execute the same task on their copy of the same data. Next, these replica datanodes can verify their local tasks with the help of the information embedded in the received behavior profiles. This can be realized in two steps: (i) comparing the system & library calls metadata and (ii) statistical matching of the memory access patterns. Finally, datanodes can share their observations for consensus and report an intrusion to the namenode (master) if they find any discrepancy. The technique can be tested on a small hadoop cluster using the default MapReduce examples. In one test, the results showed that our approach can detect insider attacks that cannot be detected with the traditional analysis metrics.

FIG. 1 shows the increase in market forecast in the last five 25 years. Some security in big data platforms can be realized by incorporating some traditional security measures such as user authentication, access rights, activity logging and data encryption. Some data security concerns in big data platforms can be addressed by proposing attack detection techniques that analyze compiled programs. However, such static analysis techniques have their limitations. For example, static analysis techniques will not work if a datanode configuration is changed by an insider or if a rogue datanode intentionally masquerades the information it shares. Hence, in this disclosure, a tighter intrusion detection technique is proposed that is based on runtime analysis of processes. In some embodiments, the runtime analysis is focused memory usage of a process.

Typically in a big data cluster, when a user submits a request, the namenode (master) creates a job and schedules it for execution on the datanodes (slaves) that host the required data for the job. When the job is scheduled to execute at a datanode, static analysis techniques can be run on the associated compiled binary or bytecode to find vulnerabilities and bugs. These static analysis techniques for intrusion detection can help mitigate the effects of vulnerabilities caused due to misplaced jumps, uninitialized arguments, null pointers, dangling pointers (use after free), division by zero etc. Static analysis of a program binary helps in identifying some attacks but vulnerabilities due to buffer-overflows, shared libraries and dynamic linking will continue to exist even after static analysis.

Memory corruption attacks can be detected and prevented at runtime with the help of sanitizers. But handling improper calls due to programmer errors is still a difficult problem to address. Another difficult attack scenario to address is insiders and masqueraders in distributed environments such as cloud and big data. Due to the distributed nature of big data platforms and their requirement to provide data consistency (with the help of replication), it is possible to perform dynamic analysis of processes for attack detection at runtime and still prevent adverse outcomes such as data loss.

A distributed, runtime intrusion detection technique can be used that understands and works according to the properties of big data platforms. A behavior profile can be created by the primary datanode for every job it executes. This profile can contain system & library call traces along with memory access patterns of the process as observed during process execution. The metadata from the call traces can be used to verify consistency in call behavior among the datanodes. It can also be used for checking against normal behavior, if that information exists. As for memory access patterns, Principal Component Analysis (PCA) can be used to observe orthogonal regression among multiple memory mapping aspects.

The result of analysis is a sequence that preserves the memory behavior of the datanode. Then, a process behavior profile including information about call and memory behavior of a datanode can be shared with other replica datanodes that are scheduled to run the same job on the same data. Next, the replica datanodes can verify the calls in their local process with the call information given in the received profiles. The replica datanodes can also match the memory access pattern of their local process with that of the received, by using statistical analysis tests. The datanodes can share their observations for consensus before reporting an intrusion to the datanode.

Intrusion detection systems (IDS) can be used to detect anomalous or malicious usage in a computing device. Their design can be based on (a) knowledge from prior attacks and/or (b) learning from the behavior of programs and/or users. Knowledge-based IDS can include searching a program for known threat signatures that are stored in a database. With the drastic increase in the number of zero-day attacks, relying on a pre-populated database of threats is unsuitable. Even if we assume to have an ideal database of all possible threats, maintaining such a database would require a lot of resources and running search queries against it would be expensive. On the other hand, behavior-based IDS tries to model, analyze and compare user and/or application behavior to identify anomalies. Network usage (packets of data) can be used as a component observed by such IDS. This technique needs more resources and is more complex than signature-based IDS but it is more effective in a dynamically changing threat environment. Behavior-based IDS can capture the context and apply statistics and rules on that context to detect anomalies.

A distributed implementation of IDS can be used for systems that run on large clusters. Such an IDS would have centralized control and can detect behavioral patterns even in large networks. Efficient ways of data aggregation, communication and cooperation are key factors of success for such distributed IDS and it has to be employed at multiple levels: host, network and data. Hence, general-purpose distributed IDS implementations can be supported using big data platforms. As discussed herein, an IDS can be built that can be used for security within a big data platform itself. The IDS within a big data platform favors behavior-based distributed IDS because of the naturally large and ever increasing scope of threats.

The need for tools that can diagnose complex, distributed systems is high because the root cause of a problem can be associated to multiple events/components of the system. Recent works in the distributed tracing domain are concentrating on providing an independent service. Magpie works by capturing events in the distributed system and uses a model-based system to store the traces. Xtrace provides a comprehensive view for systems by reconstructing service behavior with the help of metadata propagation. Though it has similarities to our approach of providing task-centric causality, Xtrace concentrates on network level analysis. Retro is another end-to-end tracing tool that audits resource usage along execution path. The drawback with tools such as Xtrace and Retro is that they are tightly coupled into the system and hence need the user to modify source code. HTrace 225 is an Apache incubator project for distributed tracing which requires adding some instrumentation to your application. Pivot Trace is a dynamic causal monitoring service for distributed systems that provides a happened before relation among discrete events. Fay is another distributed event tracing platform that instruments code at runtime with safe extensions. G2 is a graph processing system for diagnosing distributed systems.

In some embodiments, tracing system & library calls can be used to detect intrusions. Short sequences of system calls executed by running processes can be used as a discriminator between normal and abnormal operating characteristics. Many models such as Bayesian Classification, Hidden Markov Models (HMM) and process algebra can be used for system call sequence analysis.

In some embodiments, system and library call metadata can be used to build behavior profile of a process. This is done by extracting information about system calls made during runtime from the call stack. Also, information related to library calls can be included in our behavior profiles because big data frameworks use library calls that can be completely accounted for. This aspect is similar to AWS CloudTrail which enables user to retrieve a history of API calls and other events for all of the regions within the user's account. Call trace anomaly based intrusion detection idea can be adopted and modified to fit big data platforms accordingly.

Programmer errors can be a huge concern to security architects because anticipating the vulnerabilities due to programmer errors is difficult but at the same time they can give leeway to the attackers in their attempt to compromise a system. Generally, vulnerabilities due to programmer errors can be mitigated by enforcing control-flow integrity. More specifically, programmer errors that lead to memory corruptions can be handled by sanitizing memory instructions in a program at compile-time. Though this approach is very memory expensive, it seems to work very efficiently for applications that run on a single machine. Practical usage on real-time distributed applications is not feasible.

For distributed applications, focus on detecting a subset of programmer errors that cannot be detected until runtime can be used. One popular way of detecting attacks due to such vulnerabilities is by continuous monitoring of user and/or application behavior. Insider attacks are known to be difficult to detect and prevent in general. This problem intensifies when the system under consideration is deployed on a large, distributed cluster. The ideal solution to detect and/or prevent insider attacks is by automating every aspect of a system such that there is no human intervention at all but obviously this is not feasible. Especially for big data systems, there is usually a service stack at the provider's end and another service stack at the client's end. Hence, cloud service providers such as Amazon and Google reduce the scope for insiders by adopting a two-step procedure: (a) making most aspects of their systems to run automatically and (b) asking their clients to do the same.

Understanding memory access patterns of big data applications can help in profiling them from their data usage perspective. Patterns in bandwidth usage, read/write ratio or temporal and spatial locality can be used when observing memory accesses of a process. For example, it can be observed that memory access patterns of big data workloads are similar to traditional parallel workloads in many ways but tend to have weak temporal and spatial locality. When characterizing memory behavior of big data workloads, one can observe the characteristics such as memory footprints, CPI, bandwidth etc. of the big data workloads to understand the impact of optimization techniques such as pre-fetching and caching. In distributed computer systems, nodes of the cluster are typically virtual machines. For example, a Hadoop datanode is a process which dynamically dispatches tasks every time a job is scheduled. So, profiling the sizes of the private and shared memory accesses of all tasks will give the memory access pattern of the datanode.

Principal Component Analysis (PCA) is an unsupervised linear transformation technique that finds the directions of maximal variance in a given dataset. A principal component is a linear combination of all the variables that retains maximal amount of information about the variables. When used for fitting a linear regression, PCA minimizes the perpendicular distances from the data to the fitted model. This is the linear case of what is known as orthogonal regression or total least squares, which is appropriate when there is no natural distinction between predictor and response variables. This works with the memory access pattern matching problem because the features of memory access are all random and do not follow any predictor-response relation.

According to the theory of orthogonal regression fitting with PCA, p observed variables can fit an r dimensional hyperplane in p dimensional space where r is less than equal to p. The choice of r is equivalent to choosing the number of components to retain in PCA. For this work, r and p are the same because we are not trying to reduce the dimensionality. But to profile memory usage of a process and later compare it with other profiles, we need a function that can explain the memory behavior. For this, we use the T-squared values that can be calculated using PCA in the full space.

A software-centric threat model can be used that dissects the big data platform design to understand its operational vulnerabilities. The primary focus can be to mitigate the effect of operational vulnerabilities caused at runtime due to improper usage of system and library calls by programmers. The reason for this choice is two-fold: (a) impact of operational vulnerabilities due to programmer errors cannot be estimated upfront and (b) programmer errors are usually considered to be resolved at compile time. Our threat model also includes illegitimate use of data access privileges by insiders. For example, we want the proposed system to identify rogue datanodes masquerading as normal datanodes. For this purpose, we analyze memory access patterns at a process level. But it is difficult to differentiate between unusual accesses and corrupt accesses. Both scenarios can be treated as threats. Some assumptions about the system can be made to fit this threat model. Those assumptions can include:

All datanodes use the same architecture, operating 350 system and page size.

The path to framework installation is the same on all datanodes.

The communication network will always be intact.

The communication cost among replicas (slaves) is at most the communication cost between namenode (master) and datanodes (slaves).

A solution for detecting intrusions at runtime within the services provided by a big data platform is discussed below. The motivation comes from the requirement to have a runtime detection algorithm in the system architecture. Our framework can be equipped with two compile time attack detection techniques, among others. Hence, for this disclosure, the big data platform under consideration can be equipped with a secure detection framework that can account for control-flow attacks that can be detected by static analysis.

The first part of our proposed solution deals with building a behavior profile for every process running on a datanode. Process behavior profiles can be built by observing a variety of process characteristics. We are interested in designing the behavior of a process based on the system & library calls and the memory accesses it makes during its runtime. While system and library calls help understand the work done by a process, memory accesses talk about the data usage of a process. This disclosure merges the information from these two aspects of a process system & library calls and memory access, to create a process behavior profile. Masquerading such behavior profile is extremely difficult for attackers. The algorithm for creating a process behavior profile is given in Algorithm 1 below. The process behavior profile representing the datanode will be a data structure with three entries: (1) identifier, (2) map with one entry per call, and (3) $t^2$, T-squared vector from PCA on memory access information. The identifier needs to be similar for a process across datanodes.

A call instruction in a program has the potential to take the control away from program space to unknown territories. This property of a call instruction makes it an attractive target for attackers. Two specific kinds of call instructions known as the system calls and library calls can be used, among others to profile a process. The system calls are programmatic ways of requesting a kernel service from the operating system. The list of possible system calls is specific to the operating system in use and the number of possible system calls is usually constant and limited. For example, the Linux family of operating systems has approximately 140 system calls. Since we specifically target big data platforms, it is implicit that a certain framework such as hadoop or spark is installed on the cluster under surveillance.

An advantage of library call monitoring is that the number of jars and shared library objects can be predetermined and these frameworks should have a predefined installation path which will not change unless there is a system level modification. The problem with tracing system & library calls made by a process at runtime is that the order in which these calls are made might not persist across multiple runs of the same program. But this is important to our security framework since it tries to match information across replica datanodes. In this case, simply trying to perform an exact match on the call stack will not work if we want to use call information for intrusion detection in a distributed computing domain.

To combat this problem, a process behavior profile can be designed to be descriptive of the calls made by a process. Instead of using the call stack, metadata about system & library calls can be extracted from the call stack and that information can be used for intrusion detection. In one embodiment, each row in a process behavior profile representing a library or a system call can describe it using four fields: (a) full class name of the callee, (b) method signature, and (c) source code line number and (d) count of the number of times this call was made by the process. A hash of the full class name is used as index for quick look-up. The other difficulty in using call information for intrusion detection is that the number of calls made by a process does not have to be the same for different datanodes. But a huge variation in the number of times a particular call is made can be used as an indicator for intrusion.

While system & library calls help in profiling a process and detect some attacks, they are susceptible to attacks as well. For example, a rogue datanode can masquerade its identity and send the process information to our security framework before an attack is launched. This will lead to a false negative scenario where the datanodes reach to a consensus about a process even though a rogue node compromised a process. Also, system calls in call stack give us the picture only until a file or device gets mapped to memory. All further read( ) and write( ) calls are made on the mapped memory using pointers. Hence, it is important to have an alternate perspective about the process in the behavior profile. Memory access information helps in the fine granularity of event reconstruction. Memory accesses during runtime give information about program characteristics such as the size of private and shared memory accessed by the program, number of clean and dirty pages in program memory etc. There are many advantages of using memory access patterns in behavior profiles, such as, among others:

(1) information can be gathered periodically.
(2) can be accomplished easily with hardware support.
(3) gives insight about the data aspects of a process.
(4) maintains differential privacy.

Algorithm 1 Algorithm to create process behavior profile

```
1:  procedure BEHAVIOR PROFILE
2:      pid ← get the process id of datanode
3:      interval ← set periodic interval for measurement
4:  getProfile(pid):
5:      Profile ← empty map
6:      Calls ← call getCalls(pid)
```

Algorithm 1 Algorithm to create process behavior profile

```
7:      MemAccess ← call getMemAccess(pid)
8:      Hash ← hash of all call paths
9:      Profile ← insert([Hash, Calls], MemAccess)
10:     return Profile
11: getCalls(pid):
12:     while callstack(pid) = system or library call do
13:         callee ← store the callee
14:         signature ← store the signature of the method
15:         callPath ← store the path
16:         callCount ← +1
17:         hash ← hash of the path
18:         info ← callee, signature, path, count
19:     return map(hash, info)
20: getMemAccess(pid):
21:     while elapsed=|interval do
22:         if smaps(j).type = private or shared then
23:             thisAccess[0] ← smaps(j).Rss
24:             thisAccess[1] ← smaps(j).Private
25:             thisAccess[2] ← smaps(j).Shared
26:         MemAccess ← add thisAccess
27:     Result ← call PCA(MemAccess)
28:     return Result
```

Today, most distributed systems are a cluster of nodes in their abstract forms i.e. each node is a virtual machine or a process running on a virtual machine. Hence, the process behavior profile can be designed to include memory accesses made by the processes. With modern operating systems such as Linux, memory analysis is a complicated topic. It is extremely difficult to know about how memory is organized inside a running process and how the kernel handles the different allocation methods and process forking. For example, most modern operating systems use copy-on-write semantics when forking a process where child process address space is mapped to the same backing pages (RAM) as the parent, except that when the child attempts to write to one of those pages, the kernel transparently copies the memory contents to a new, dedicated page, before carrying out the write. This approach speeds up the forking procedure but complicates the memory analysis.

Usually, the kernel delays the actual allocation of physical memory until the time of the first access. Hence, knowing the actual size of physical memory used by a process (known as resident memory of the process) is only known to the kernel. This memory mapping information from the kernel can be used to analyze the memory pattern of processes. A mapping is a range of contiguous pages having the same back-end (anonymous or file) and the same access modes. Features of memory mapping that are relatively straight forward to analyze can be chosen when analyzing memory. The private and shared pages of a process in the RAM are observed as parts of memory access patterns. Private memory always belongs just to the process being observed while shared memory may be shared with its parent and/or children processes. In theory, the number of pages allocated to a process should be equal to the sum of its shared and private pages. In some embodiments, to alleviate the penalty of constant monitoring, this information can be gathered periodically, such as, for example, every 2 seconds.

Figure 2A:
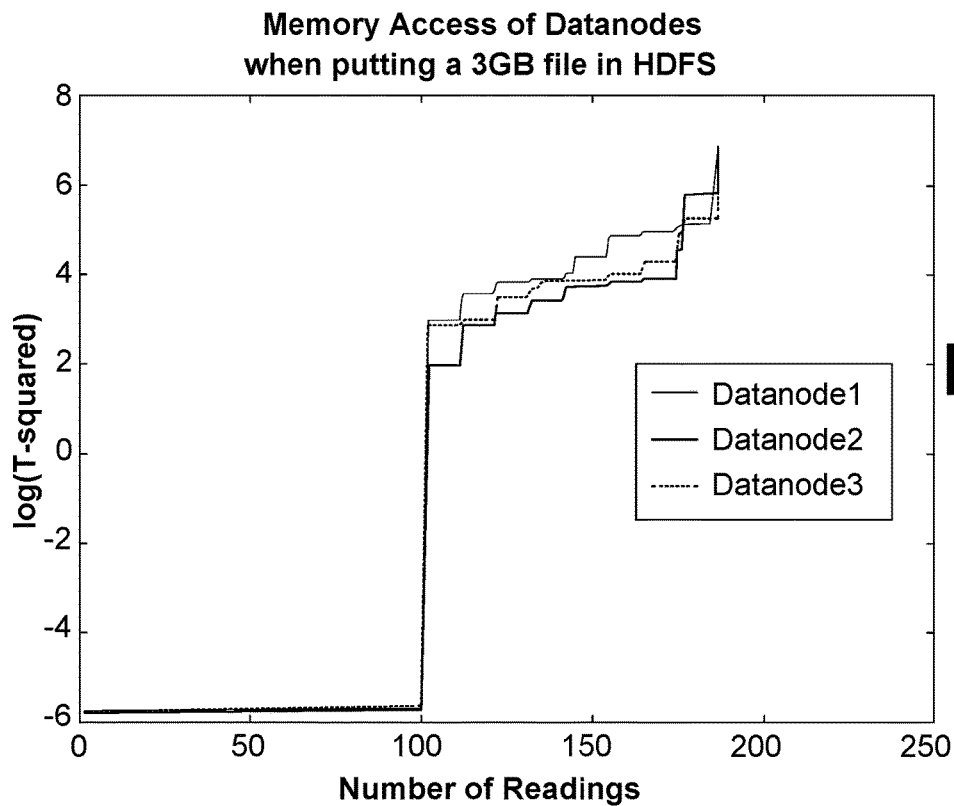
FIGS. 2A-C illustrate behavioral datanodes in a Hadoop cluster according to various example embodiments.
Figure 2B:
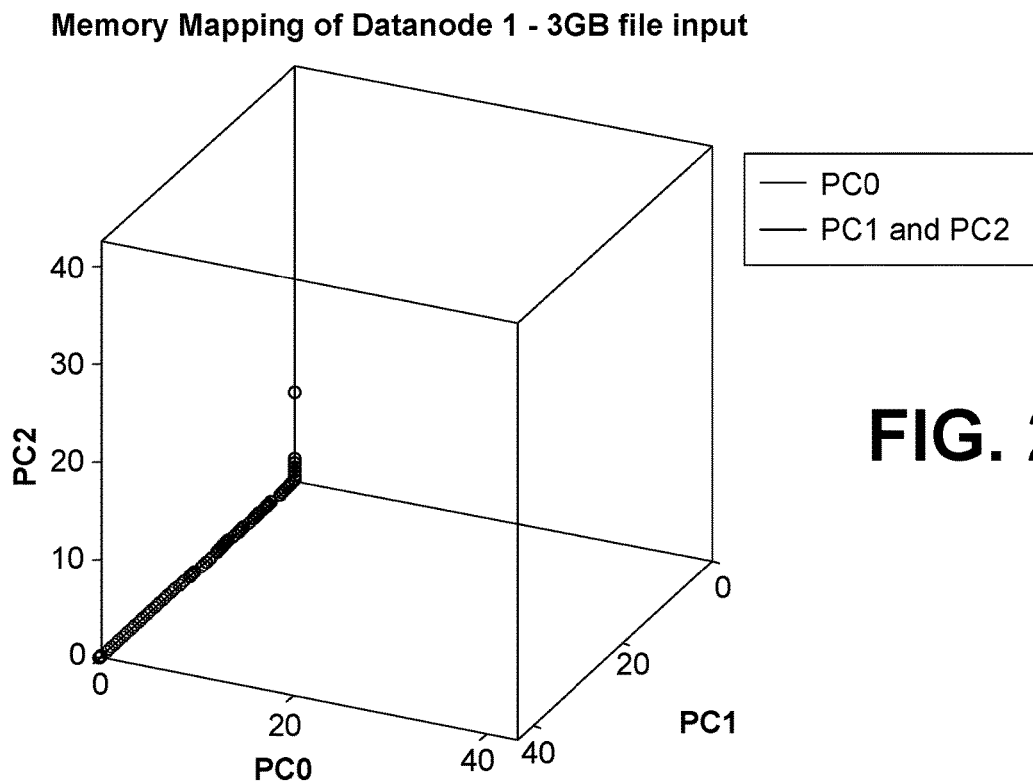

Two simple and typical big data work flows can be used to demonstrate the insights provided by system calls and memory accesses of a process. The first example is about writing a 3 GB file to HDFS in a Hadoop cluster. FIG. 2A shows the results of principal component analysis on memory mappings ($t^2$) of the datanodes. The 3D plot in FIG. 2B shows orthogonal regression among principal components which are calculated from observations made from memory mapping sizes of a datanode. The three dimensions used in this graph are the three different measurements taken at process level resident set, private pages and shared pages. The red line indicates that the pages in RAM for a process are a combination of its private and shared pages. One observation or data point that seems to be an outlier. This can be due to multiple reasons such as swapping or giving away allocated memory to other processes in need etc. Table 1 has the results of f test performed on $t^2$ statistic calculated as a result of PCA on the sample memory observations made during this test. A random sample of the smallest and largest memory accesses are taken into consideration for this test. Though this is atypical for statistical tests, the intent of this example 500 is to show that the null hypothesis holds true.

TABLE 1

Results of F-Test on Hotelling's T-squared statistic ($t^2$) from PCA when Datanodes are idle

| F-Test | Nodes 1 & 2 | Nodes 1 & 3 | Nodes 2 & 3 |
|---|---|---|---|
| h | 0 | 0 | 0 |
| p | 0.66 | 0.74 | 0.9 |

Figure 2C:
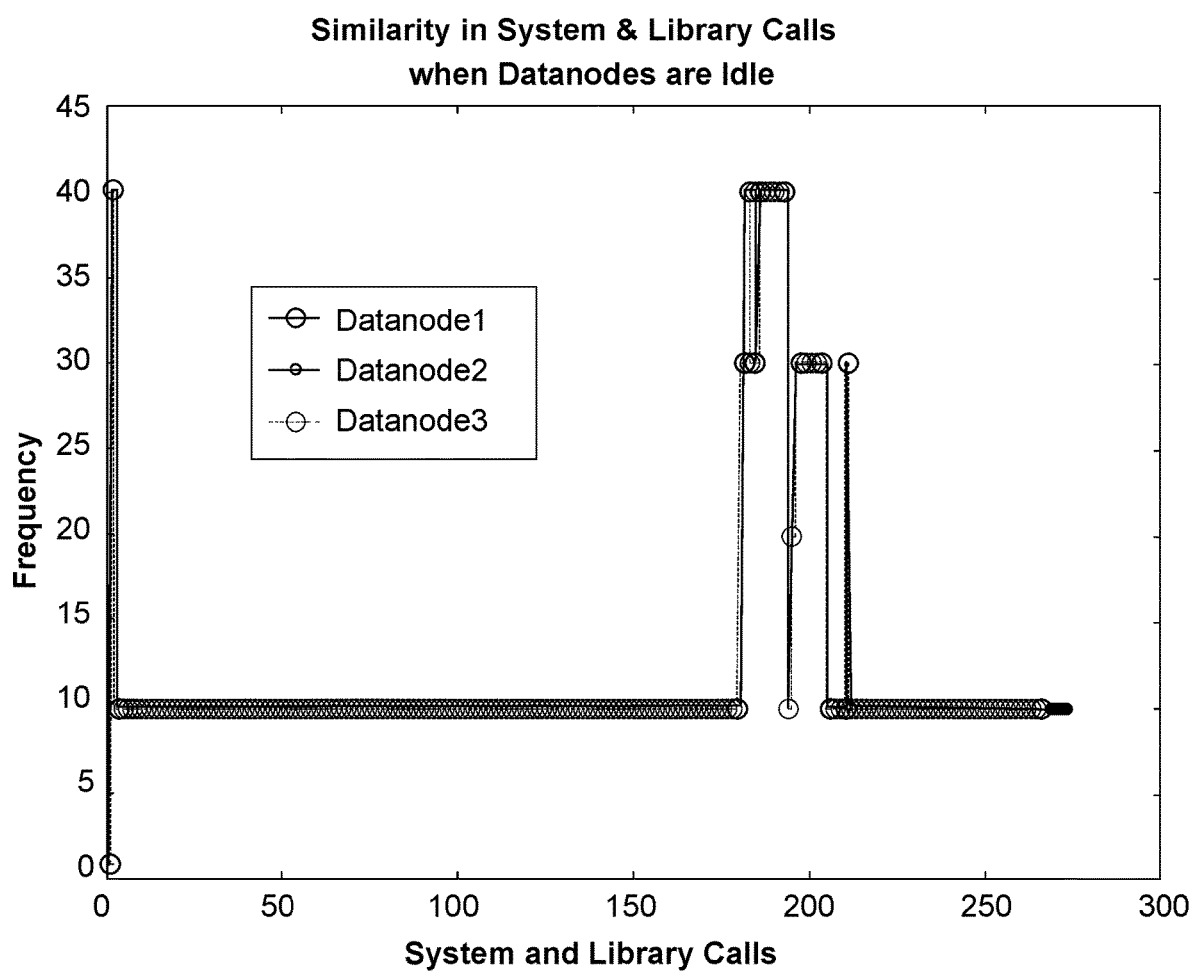

The first row in the table (h=0) indicates the test accepts the null hypothesis. Here the null hypothesis is that the data comes from normal distributions with the same variance. The alternative hypothesis is that the population variance in memory access sizes of a datanode is greater than that of the other datanode. The second row of the table, p values, are very high (>0.5) and imply confidence on the validity of the null hypothesis that variance in memory access is equal for all datanodes. The second example shows the simplest case with a hadoop cluster. FIG. 2C gives an insight to the system and library calls made by datanodes when they are idle, e.g., no user submitted jobs but just maintenance. Each slave node made a total of 275 system calls during the time of observation. The calls and their frequencies were consistent across all datanodes. This can be observed with the overlapping call frequency patterns in FIG. 2C. Whether we consider the call information of idle nodes or the memory access information when putting a file in HDFS, it can be concluded that the datanodes are in harmony.

Representing memory access pattern as a sequence of access size and using approximate string comparison or edit distance is one way to measure similarity between patterns. But there are many aspects to a memory access and creating a memory access profile with fine grained detail preserves more information for comparison across different machines. A straightforward comparison of all observed memory features is redundant and not always feasible. Hence, an approximation method can be used that uses multiple features when creating and comparing a process profile than using just one feature. Each access pattern includes information about three features of a process memory access: (a) size of resident pages in the RAM for the mapping, (b) size of shared pages in that mapping, and (c) size of private pages in the same mapping. We use PCA to fit the measured 3 dimensional data as linear regression and share the resultant $t^2$ information for comparing and verifying memory access patterns of two datanodes. PCA calculates three metrics for a given sample dataset: coefficients, scores and mean. The coefficients of a principal component are given in descending order of component variance calculated by the singular value decomposition (SVD) algorithm. This is calculated using Equation 1 where X is a principal component, A is the eigenvalue and Y is the eigenvector.

This is calculated using Equation 1 where X is a principal component, A is the eigenvalue and Y is the eigenvector. The sample means, x⁻ with n observed memory access sizes per process is calculated using Equation 2 where $x_i$ is an individual memory access size from datanode x. The sample variances, $\sigma^2_x$ is calculated using Equation 3 with n−1 degrees of freedom. Since our measurements use multiple features of a memory access, covariances are the eigenvalues of the covariance matrix of input data and they can be calculated using Equation 4 where $W_{x1,x2}$ is the covariance in two features of memory access of datanodes x. Here $x_{i,1}$ is the memory access size of the $i^{th}$ observation for the first memory feature. When observing k memory features, we would have an array of values $[x_{i,1}, x_{i,2} \ldots x_{i,k}]$ for each observation. Scores are the representations of the input data in the principal component space. The $t^2$ values can be calculated from the memory patterns on each datanode using Equation 5. But using PCA, the $t^2$ values are calculated as sum of squares distance from the center of the transformed space. Upon having the $t^2$ values, difference between them can be calculated using one way analysis of variance as given in Equation 6 where the null hypothesis is that all group means are equal. Here, $t_x^2$ is the t-squared vector for datanode x, $t_y^2$ is the t-squared vector for datanode y and p is the probability that the means of $t_x^2$ and $t_y^2$ are the same.

$$X = \lambda^{1/2} Y \qquad (1)$$

$$\bar{x} = \frac{\sum_{i=1}^{n1} x_i}{n1} \qquad (2)$$

$$\sigma_x^2 = \frac{\sum_{i=1}^{n} (\bar{x} - x_i)}{n-1} \qquad (3)$$

$$W_{x1,x2} = \frac{1}{n-1} \sum_{i=1}^{n} (x_{i,1} - \bar{x})(x_{i,2} - \bar{x})^T \qquad (4)$$

$$t_x^2 = n(\bar{x} - \mu)^T W_x^{-1} (x - \mu) \qquad (5)$$

$$p = anova(t_x^2, t_y^2). \qquad (6)$$

Algorithm 2 Algorithm to verify process behavior profile

```
 1: procedure VERIFY PROFILE
 2:     pid ← get the process id from datanode
 3:     Local ← behavior profile from this node
 4:     Recv ← behavior profiles from other nodes
 5: compare( ):
 6:     for thread t in pid do
 7:         result1 ← call CompareCalls(t)
 8:         result2 ← call CompareMemAccess(p)
 9:         result ← result1 & result2
10:         notify result        ▷ similarity in calls & memory accesses
11: CompareCalls(t):
12:     for call c in t do
13:         if hash(c_path) = Recv.find( ) then
14:             if count (c_Local) ⬌ Count(c_Recv) then
15:                 return true
16:             else
17:                 return false
18: CompareMemAccess(pid):
19:     if compare (t_Recv², t_Local²) then
```

-continued

Algorithm 2 Algorithm to verify process behavior profile

20:     return true
21: else
22:     return false

Algorithm 3 Algorithm to compare process behavior profiles

1: procedure COMPARE PROFILES
2:     $t_{Local}^2 \leftarrow$ get the process profile from datanode
3:     $t_{Recv}^2 \leftarrow$ received process profiles
4:     for all $t_i^2$ do
5:         filter($t_i^2$)         ▷ remove tailing $t^2$ values
6:         sort($t_i^2$)
7:     if Anova($t_{Local}^2$, $t_{Recv}^2$) then
8:         compromised $\leftarrow$ Tukey($t_{Local}^2$, $t_{Recv}^2$)
9:         return true
10:    else
11:        return false The dynamic verifier function is a part of replica datanodes. It is used to parse a received behavior profile and use the extracted information to verify a local process. It will help in identifying process-level anomalies between two replica datanodes. In one embodiment, two algorithms can be used as part of anomaly detection: (1) Algorithm 2 is the generic verification algorithm that indicates an anomaly among process behavior profiles, and (2) Algorithm 3 is the comparison algorithm for differentiating between two or more memory access patterns. The system & library calls information is given in a hash map data structure with call as the id and call path as the value. Finding differences at call path level is simple because the lookup( ) function on the map will return the path in constant time.

For every call made locally by a datanode, the call path is hashed using SHA-1 hashing algorithm and the hash map of calls received from the replica datanodes is looked up for the same hash in its index set. This lookup is quick and a mismatch or lack of match indicates that the datanodes used different set of system or library calls to perform the same task. This is a necessary but not a sufficient condition to indicate an intrusion. The additional information about calls available in the behavior profile helps in solidifying the attack detection process. The difference in the number of times a system or library call is used to perform the same task should be less than a predefined threshold, when comparing processes from different datanodes.

The memory pattern of a process is represented using $t^2$ values of PCA. Since the $t^2$ values follow F-distribution, a comparison among memory patterns can be performed in two steps: (a) by running ANOVA test on the $t^2$ vectors to check if the patterns are different and (b) by running Tukey test on the results from the ANOVA test to find the attacked datanode. This can also be accomplished by any other tests that assess the equality of variances 575 such as F-test, Levene's test or Bartlett's test. In case of ANOVA, if the p-value is low (<0:05) then it confirms the rejection of the null hypothesis with strong statistical significance. Then, a multiple comparison test such as a Tukey test is used to check if the difference in the means of the $t^2$ values is significant. One big shortcoming of our approach is that it does not help in distinguishing between unusual process behavior from corrupt behavior. To be able to overcome such shortcomings, techniques such as reinforcement learning need to be used and we leave that for future work.

Figure 3:
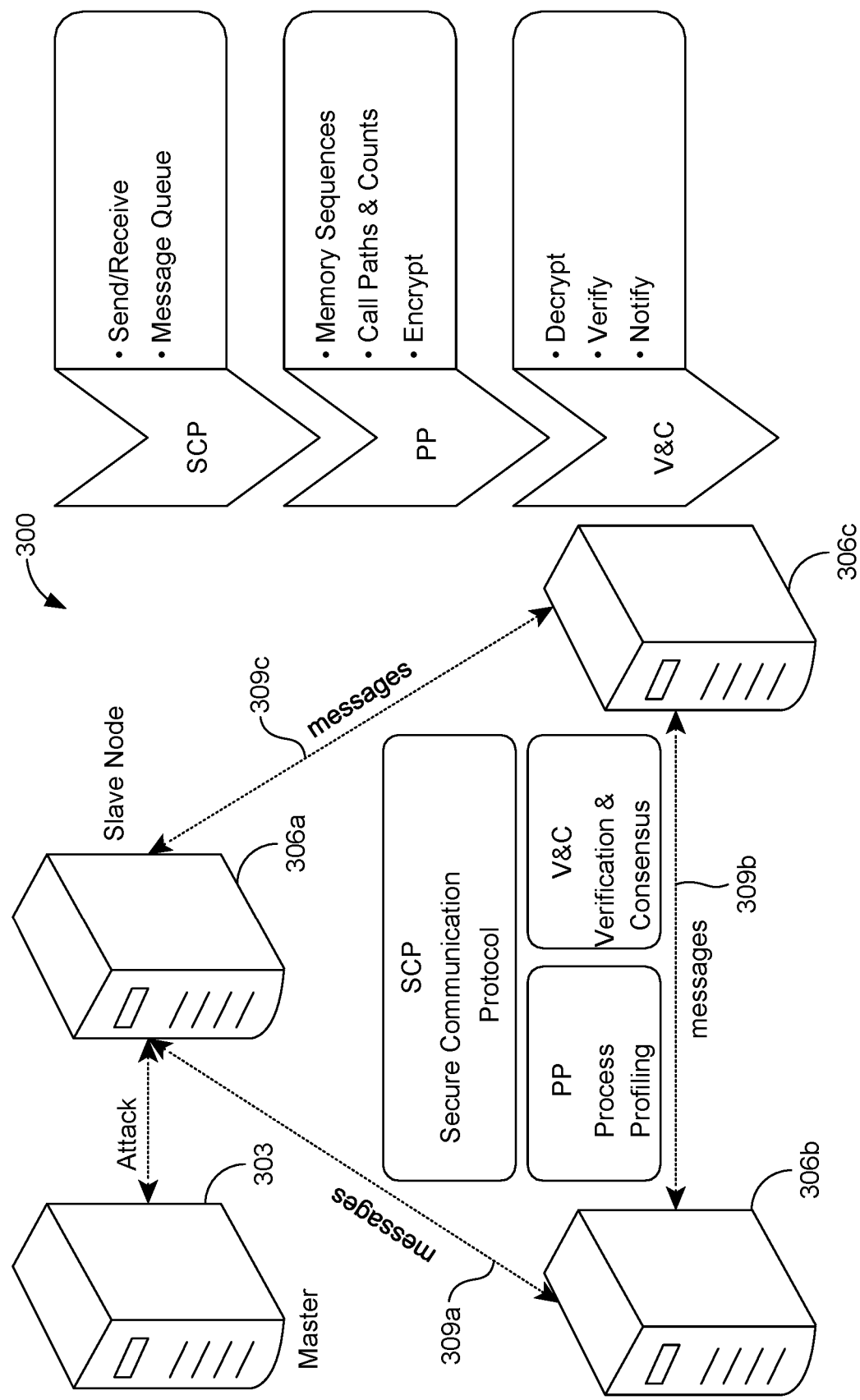
FIG. 3 illustrates a secure framework for a big data system according to various example embodiments.

With reference to FIG. 3, shown is a security framework 300 for intrusion detection according to various embodiments of the present disclosure. The intrusion detection algorithm can utilize the security framework 300 to detect intrusions. The security framework 300 can also be used for compile-time intrusion detection in big data platforms. The security framework 300 can include one or more master nodes 303, one or more slave nodes 306a-c, and one or more inter-node communication channels 309a-c. This security framework 300 can be equipped with an inter-node, key-based secure communication protocol for communication over the inter-node communication channels 309a-c. All the messages among datanodes 303 and 306a-c can be encrypted and use this communication protocol to prevent intrusion. The security framework 300 can be hosted on a coprocessor that communicates with the CPU for receiving the input data. In one embodiment, an ASIC based design can be used as a coprocessor.

The communication between the coprocessor and the main processor can use a secure protocol such as the one used by Apple processors to communicate with the secure enclave coprocessor. Adding new security instructions to the instruction set of a regular processor can also suffice. Two other elements of the security framework 300 can be the process pro ling phase and verification & consensus phase. Algorithms 1, 2 and 3 can be hosted and used for this purpose. The distributed nature of our algorithms can help in conducting the pro ling phase and the verification phase independently at each datanode 303 and 306a-c in the cluster. The distributed nature can reduce the time taken for intrusion detection. The datanodes 306a-c can work together to determine an attack exists. Attack notification can be sent from the primary datanode 306a to the master node 303 when there is a consensus among datanodes 306a-c about the existence of an attack. This consensus can be established using one of the popular leader election algorithms or consensus algorithms, such as raft and paxos.

To test the techniques discussed herein, an exemplary security framework 300 including a small Amazon EC2 cluster can be setup with 3 datanodes, 1 Namenode and 1 Secondary Namenode. Replication factor of the cluster can be set to 3 (default). EC2 m4:xlarge instances can be used for hosting the cluster. Each node can be running Ubuntu 14.04 and equipped with a 2.4 GHz Intel Xeon E5-2676 v3 625 (Haswell) processor, 4 virtual cores and 16 GB of memory. In order to simulate a compromised cluster, one of the datanodes can be explicitly programmed as the corrupt datanode. This can be achieved by using two synthetic intrusions given in Table 2. These synthetic intrusions represent different kinds of insider attacks such as: (a) misusing the system access privilege and modifying the system configuration, (b) misusing the data access privilege and copying user data for personal benefits, and (c) misusing the data access privilege and sharing or deleting sensitive user data as revenge against the system. Four of the sixteen hadoop examples that come by default with hadoop installation can be used for demonstrating the results.

A list of the MapReduce examples used along with a brief description is given in Table 3. Tests were conducted by running the hadoop map-reduce examples one at a time on the cluster. Observations from each datanode are logged periodically (every 2 seconds) and later analyzed using our framework. Statistical analysis and graphs were generated using Matlab software. Two aspects of a process system & library calls and memory accesses are observed while running the Hadoop MapReduce examples on the cluster. The call stack of the process running on the datanodes is monitored. For library & system call information, we get the path at which the concerned jar file or shared library is located.

For memory access pattern, we get the (a) memory footprint of a process by observing the number of pages referenced by the process and (b) memory consumption of the process's mappings. The memory consumption can be calculated by looking at the size of the mapping that is currently resident in RAM and the size of memory currently marked as referenced or accessed. In this work, we used the information available through smaps which only reports about memory pages that are actually in RAM. The memory consumptions of datanode processes are monitored by reading the values from smaps of all processes or tasks running on the datanode. There is a series of lines in the smaps file of a process for each mapping, such as, for example, the following: Size, Rss, Pss, Shared Clean, Shared Dirty, Private Clean, Private Dirty, Referenced, Anonymous, KernelPageSize, MMUPageSize, Locked. For proof of concept, we picked three of these features: Rss, Shared (clean and dirty), Private (clean and dirty) because in theory Rss should sum up to the combined value of shares and private.

TABLE 2

Two synthetic intrusions for testing our proposed solution

| Synthetic Intrusion | Description |
| --- | --- |
| Modify the configuration | Change the configuration on one of the datanodes. For example, allocate less heap space to slow down process execution. |
| Copy and share data | Access HDFS using a script and make unauthorized personal copies. Share the data using third party service like mail client. |

TABLE 3

List of Hadoop Map-Reduce examples used in this work

| Exp. Name | Description |
| --- | --- |
| Random text writer | A map/reduce program that writes 10 GB of random textual data per node. |
| Aggregate word count | An Aggregate based map/reduce program that counts the words in the input files. |
| Teragen | Generate one terabyte of randomly distributed data. |
| Terasort | Sort one terabyte of randomly distributed data. |

A common problem for big data related academic researchers is the relative lack of high-quality intrusion detection data sets. This is a much bigger problem if the attacks under consideration are not network related. During testing, synthetic attacks can be used. In one test case, once the system was setup, two synthetic insider attacks were performed on system while it was executing the four Hadoop MapReduce examples to emulate normal usage of the services.

In one example attack, the node configuration was modified. This attack involves exploitation of access privileges by an insider who is legally allowed to access the system and its configuration les. An insider who is a system admin can modify the configuration properties of a datanode to intentionally impact the performance of the overall system. To implement this attack, the system admin changed the datanode configuration through the hdfs-site.xml file on of the datanodes of the hadoop cluster. The amount of memory allocated for non-DFS purposes on the datanode were increased by 25% and the number of server threads for the datanode were reduced by changing the handler count to 2. Since this is a one-time modification made by an authorized user whose job entails modification of the configuration les, usual user-pro ling will not help in detecting the attack.

In another example attack, illegal copying of data can be performed. This attack involves two cases: (a) the use of noncertified (and untrusted) equipment to transfer data from 700 one machine to another, and (b) the use of certified and trusted software (such as a mail client) to transfer data from one machine to another. Similar to the previous attack, the first step involved in this attack is for the system admin to modify the configuration through the hdfs-site.xml file on of the datanodes of the Hadoop cluster. A new location local to the system admin account is added to the DFS data directory property. As a result, all blocks at this datanode have two copies one copy in the actual HDFS location used while setting up the cluster and another duplicate copy in the system admin's local folder. Next, a script is used to simulate an insider periodically transferring these duplicates files from his local folder of to another remote location using the mail client service or USB device. Since it is not possible for us to connect a USB device to Amazon EC2 instances, we included the system calls involved with using such a device in the attack script.

The results of the Hadoop MapReduce examples are given in Table 4:

TABLE 4

Information and experimental results for Hadoop MapReduce examples

| Example | Data Size (Bytes) | Time (seconds) | No. of observations | | | Sum of Squares | F Statistic | p-value |
| --- | --- | --- | --- | --- | --- | --- | --- | --- |
| | | | Node1 | Node2 | Node3 | | | |
| Teragen | 10000000000 | 109.313 | 58770 | 59970 | 60114 | 0.129 | 102.95 | $2.1e^{-45}$ |
| Terasort | 10000000000 | 694.966 | 118940 | 127310 | 124088 | 0.256 | 162.19 | $3.9e^{-71}$ |
| Random Text Writer | 1102236330 | 22.543 | 29681 | 31850 | 31025 | 0.094 | 48.64 | $7.7e^{-22}$ |
| Aggregate Word Count | 1102250820 | 14.347 | 29675 | 31850 | 31157 | 0.069 | 37.29 | $6.4e^{-17}$ |

Terasort and Teragen examples were run on a terabyte of data while Random text writer and aggregate word counter used a little more than 10 GB of data. Because of this variation in data size, it can be noticed that the time taken to complete these examples also changed accordingly. To generate the terabyte of input data, Teragen took 109 seconds while Terasort took more than 6 times that amount (695 seconds) to sort the terabyte of data. Random text writer took 22.5 seconds to generate random words of size 10 GB and Aggregate word count took just 14 seconds to count the words in that 10 GB of input data.

While the hadoop MapReduce examples were executing the way they are supposed to, our security framework performed its analysis on the datanodes that were contributing to the successful execution of those MapReduce examples.

Figure 4A:
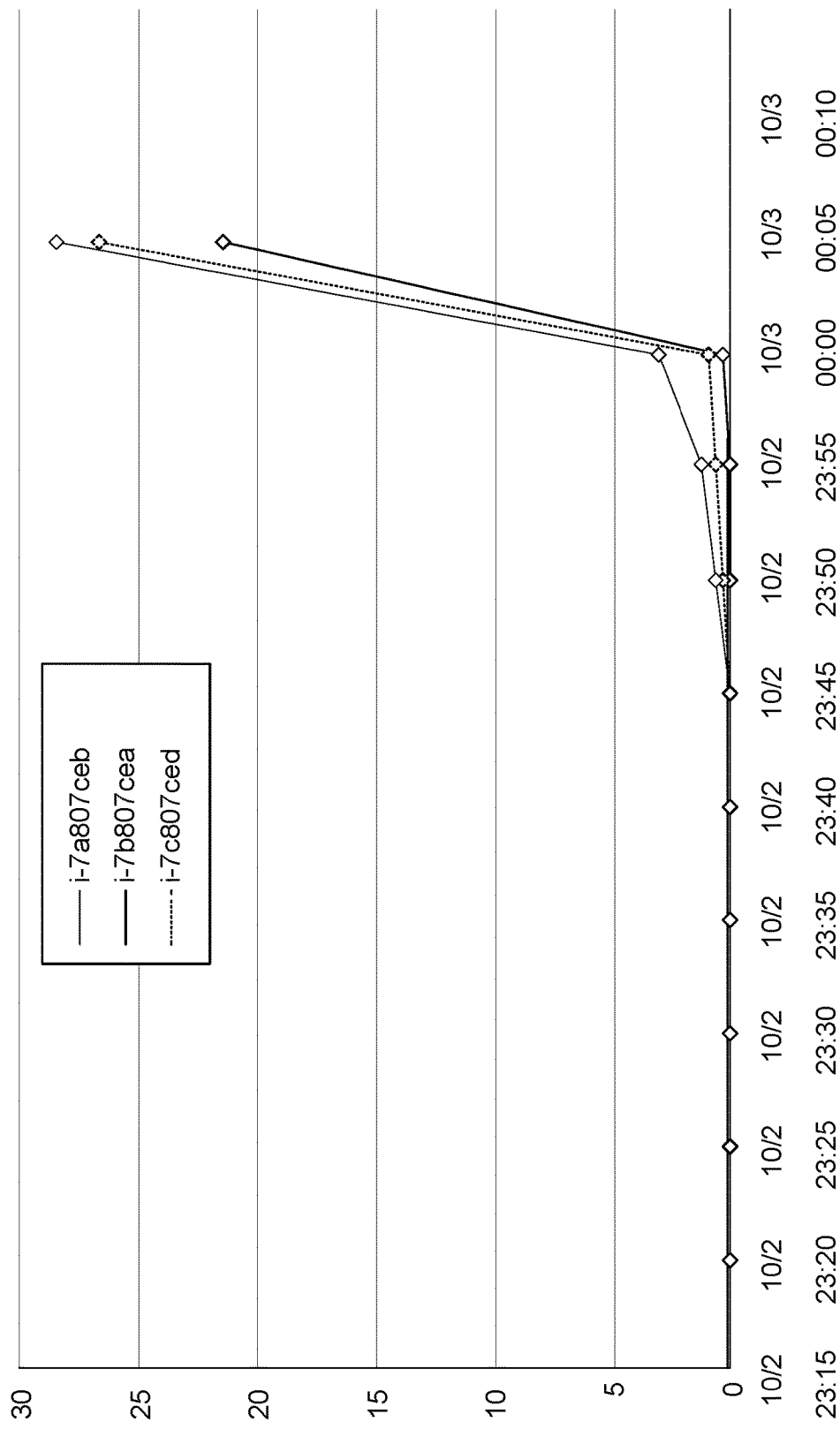
FIGS. 4A-C illustrate results of monitoring datanodes for (A) CPU utilization, (B) network in, and (C) network out according to various example embodiments.
Figure 4B:
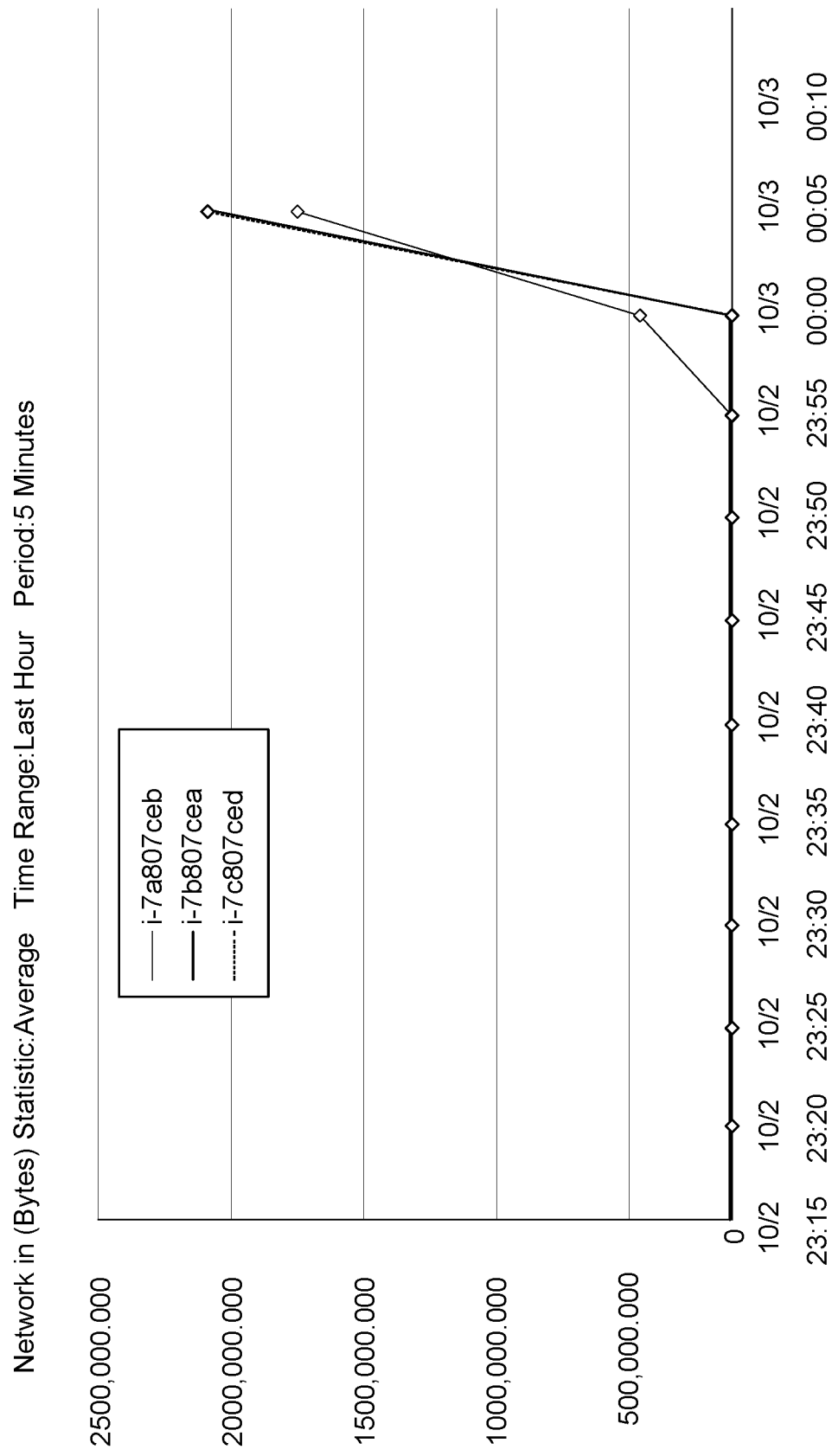
Figure 4C:
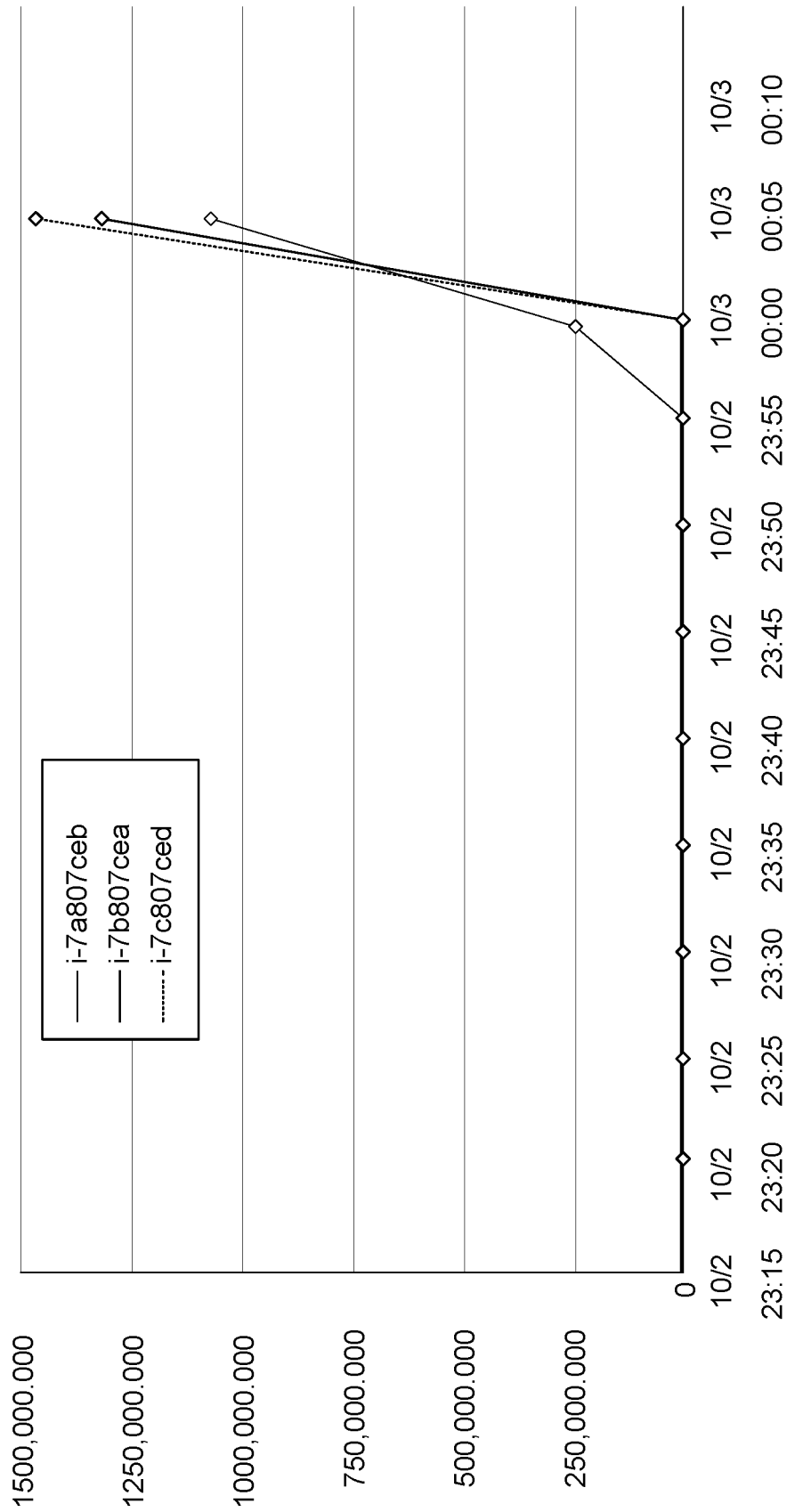
Figure 5A:
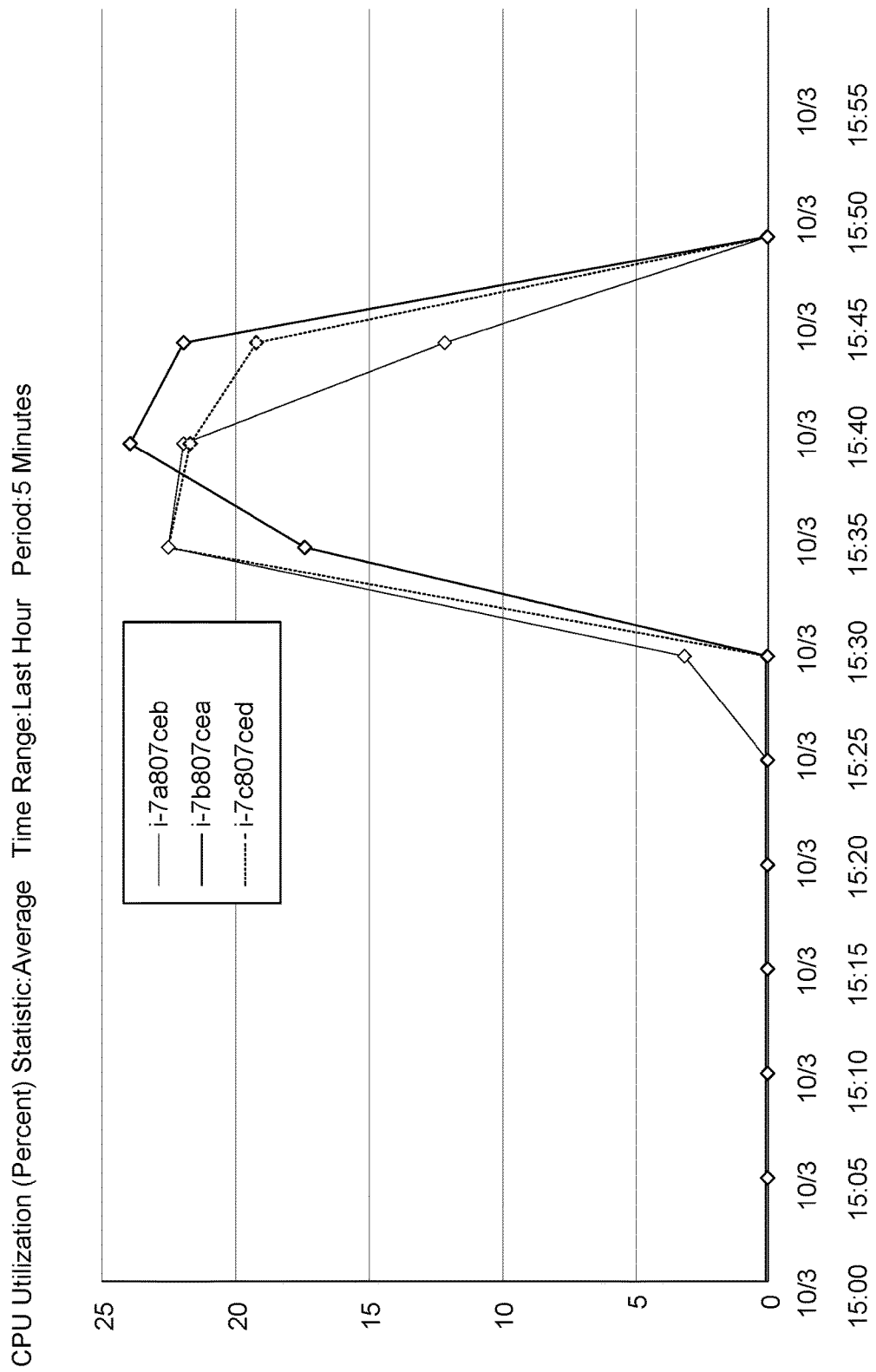
FIGS. 5A-C illustrate results of monitoring datanodes for (A) CPU utilization, (B) network in, and (C) network out according to various example embodiments.
Figure 5B:
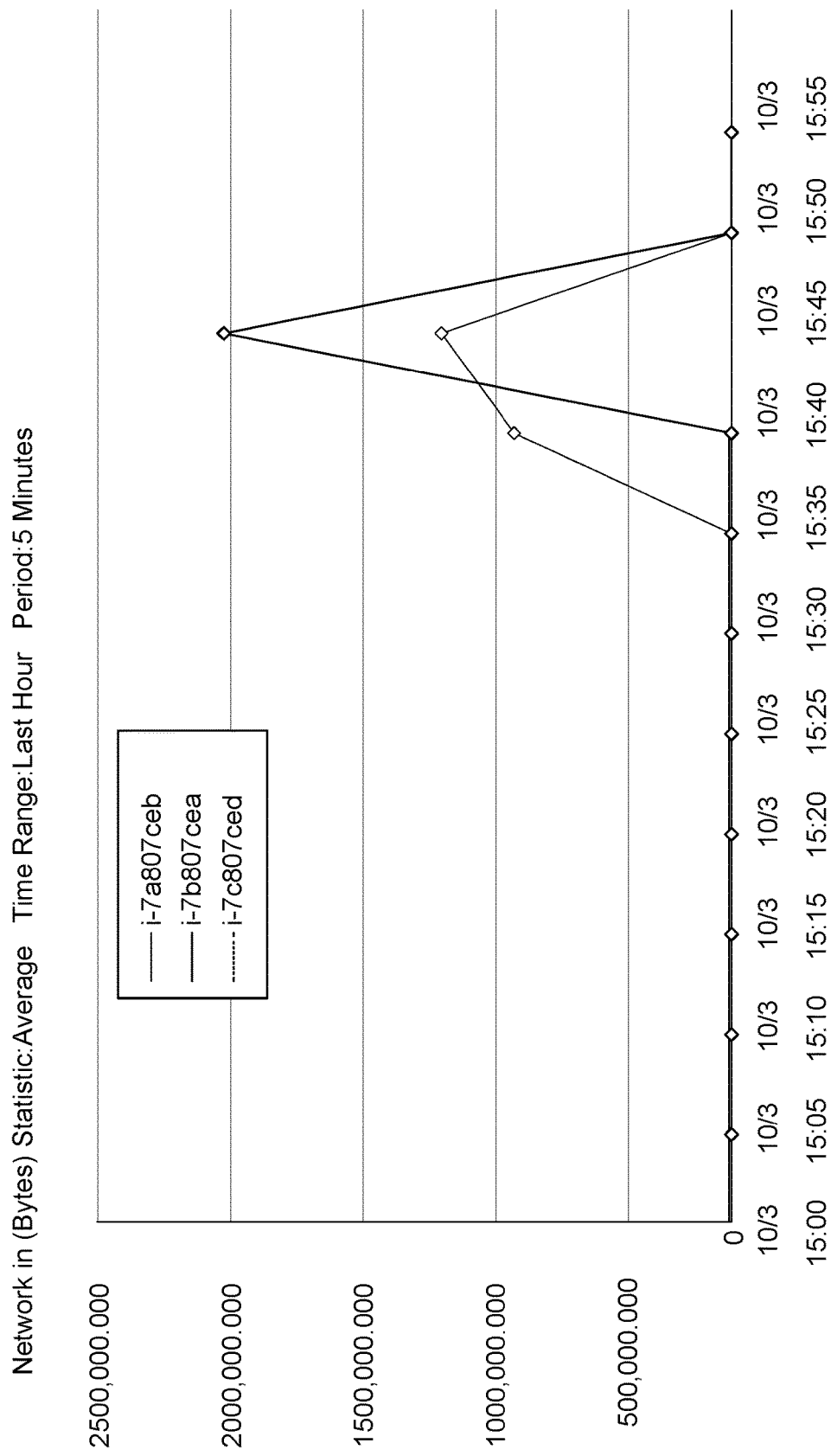
Figure 5C:
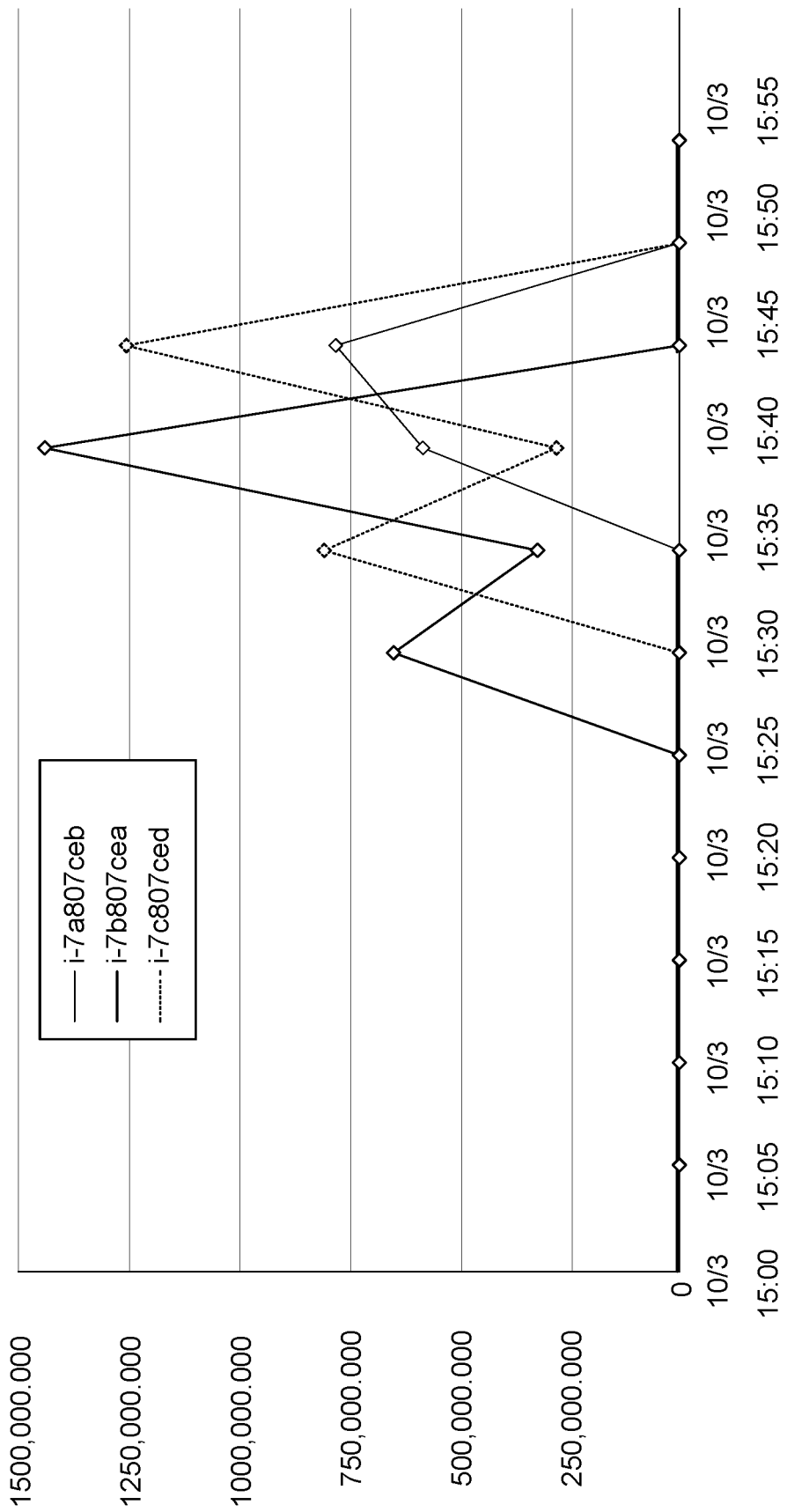
Figure 6B:
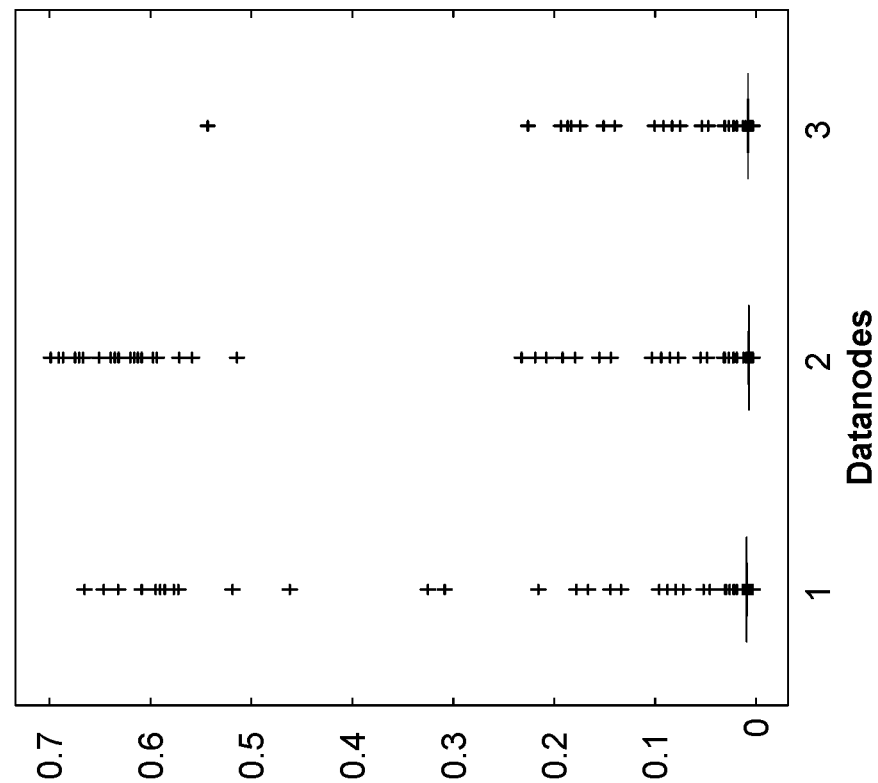
FIGS. 6A-D illustrate results of memory mapping analysis of datanodes for (A) teragen, (B) terasort, (C) random text writer, and (D) aggregate word count according to various example embodiments.
Figure 6A:
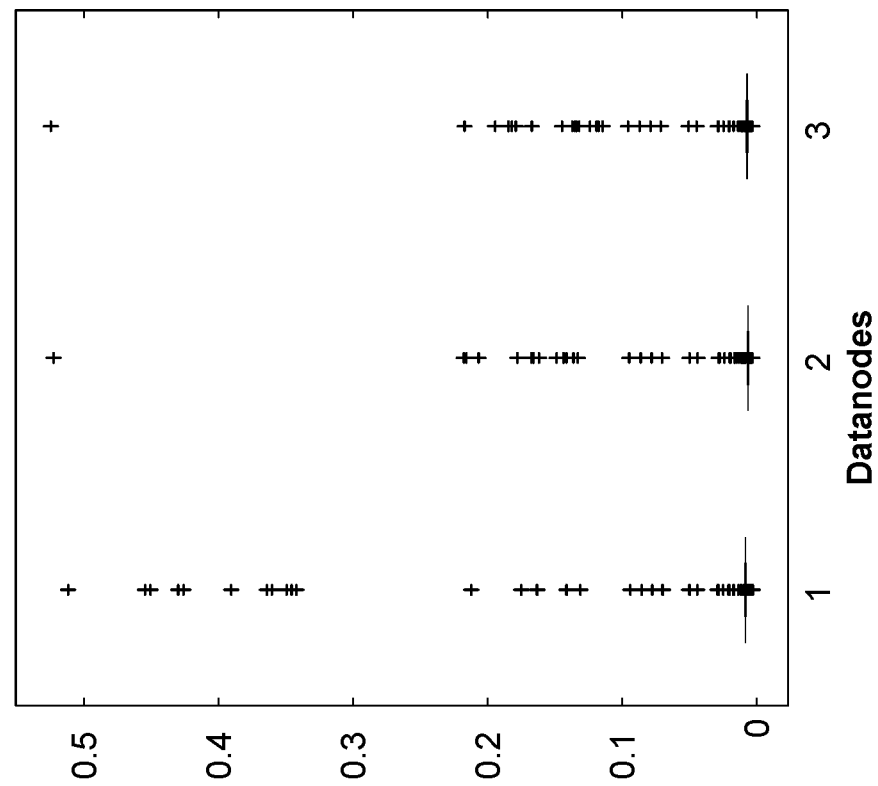
Figures 6C, 6D:
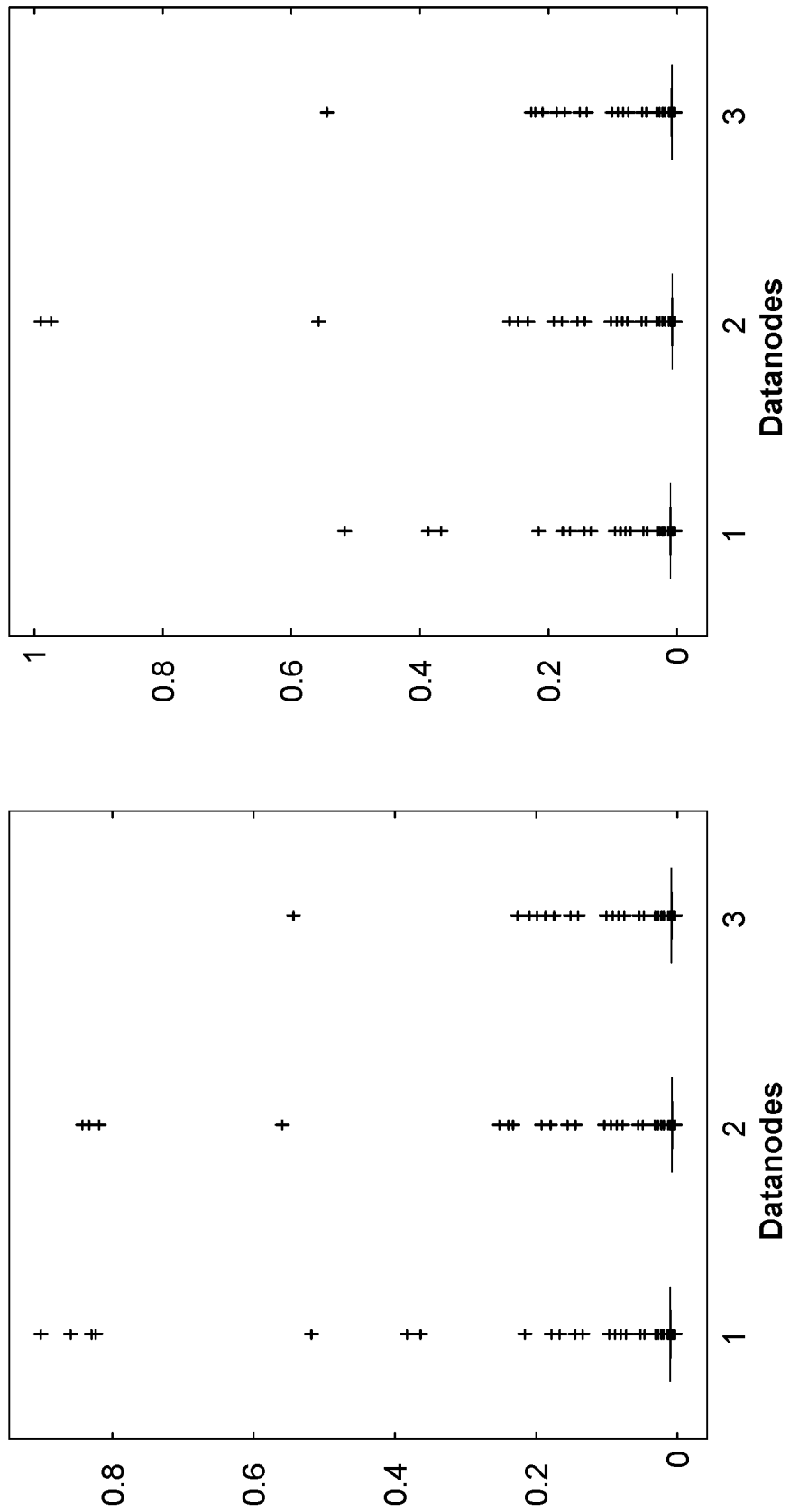
Figure 7B:
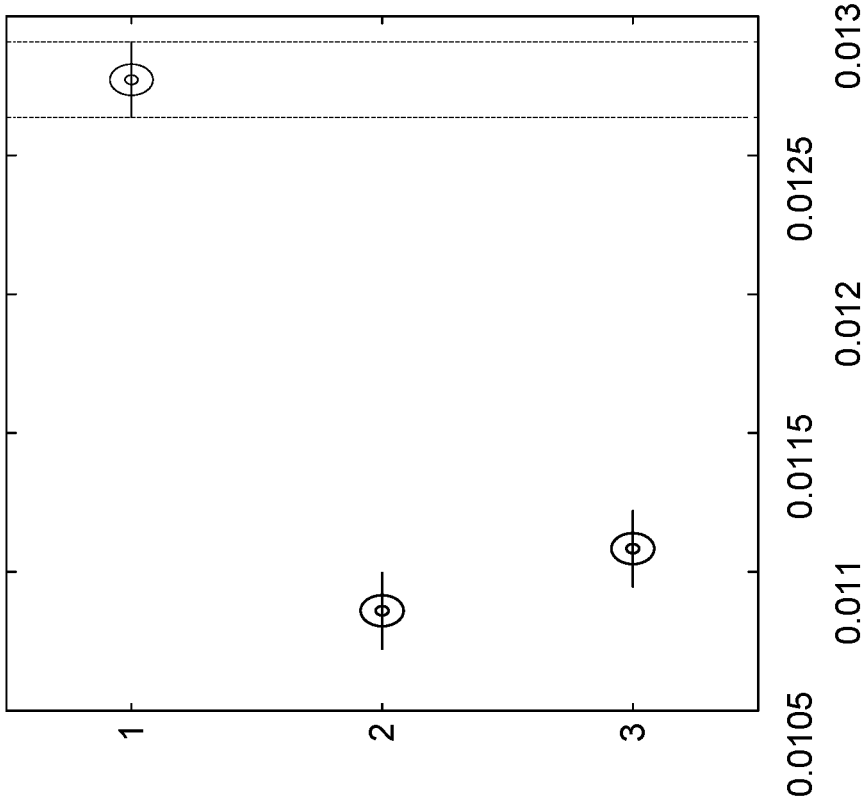
FIGS. 7A-D illustrate differences in memory of datanodes for (A) teragen, (B) terasort, (C) random text writer, and (D) aggregate word count according to various example embodiments.
Figure 7A:
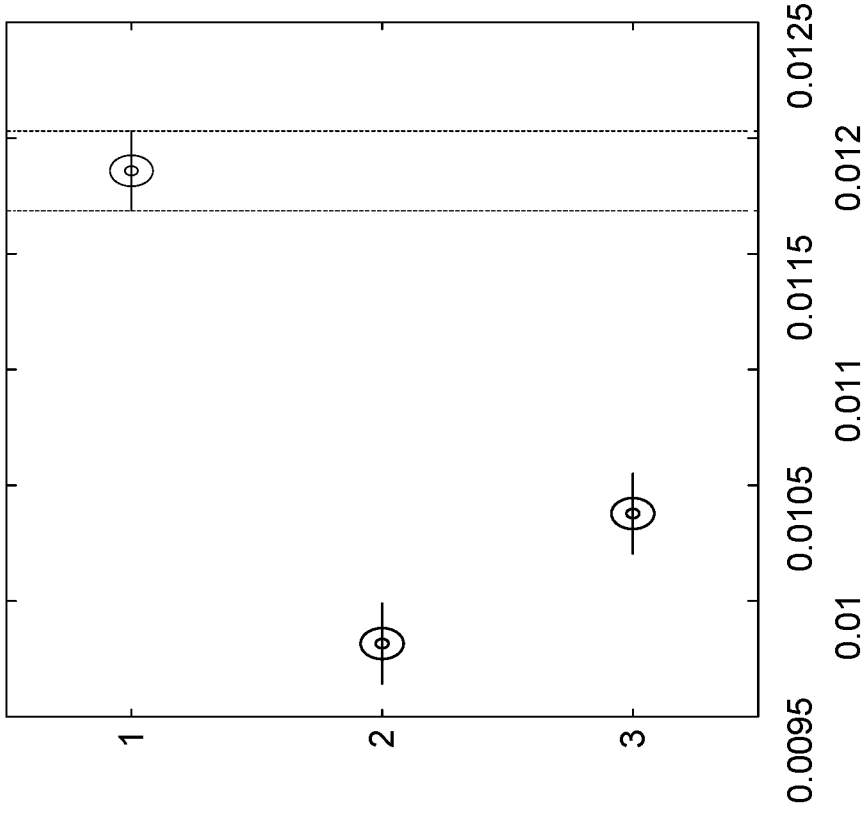
Figure 7D:
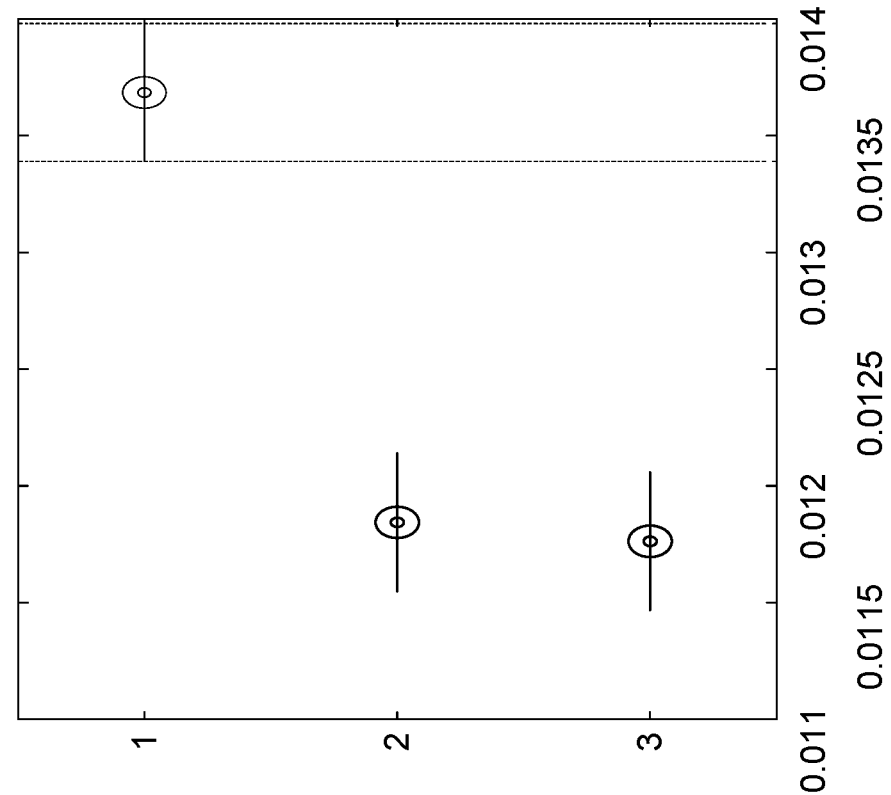
Figure 7C:
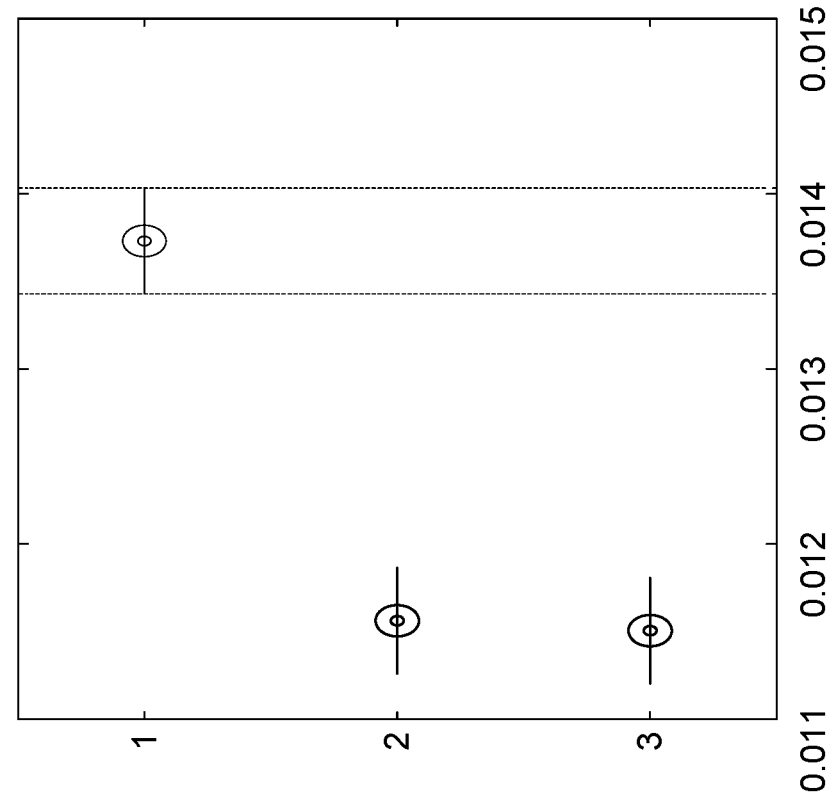

Attack 1 Results (Modifying a datanode configuration): It can be noticed from FIGS. 4 and 5 that the Amazon EC2 cluster monitoring metrics such as CPU utilization, Network traffic (bytes in and out) were unable to detect the insider attack while running the Terasort and Teragen examples. But the results from our method for the same Hadoop examples clearly indicate that there is an intrusion in the system, as noticed in FIGS. 6 and 7. ANOVA on the $t^2$ vectors from the datanodes indicates that one of the datanodes has a different distribution compared to the other two. This can be observed in the p-value column of Table 4.

Figure 8B:
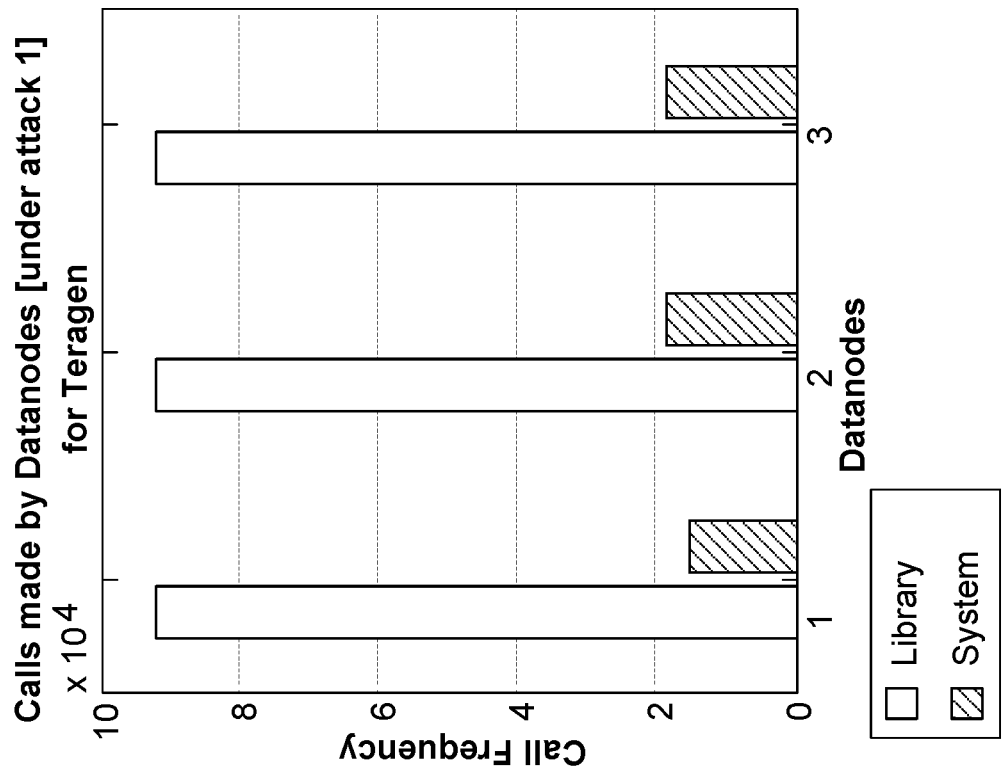
FIGS. 8A-D illustrate differences in calls of datanodes for (A) teragen, (B) terasort, (C) random text writer, and (D) aggregate word count according to various example embodiments.
Figure 8A:
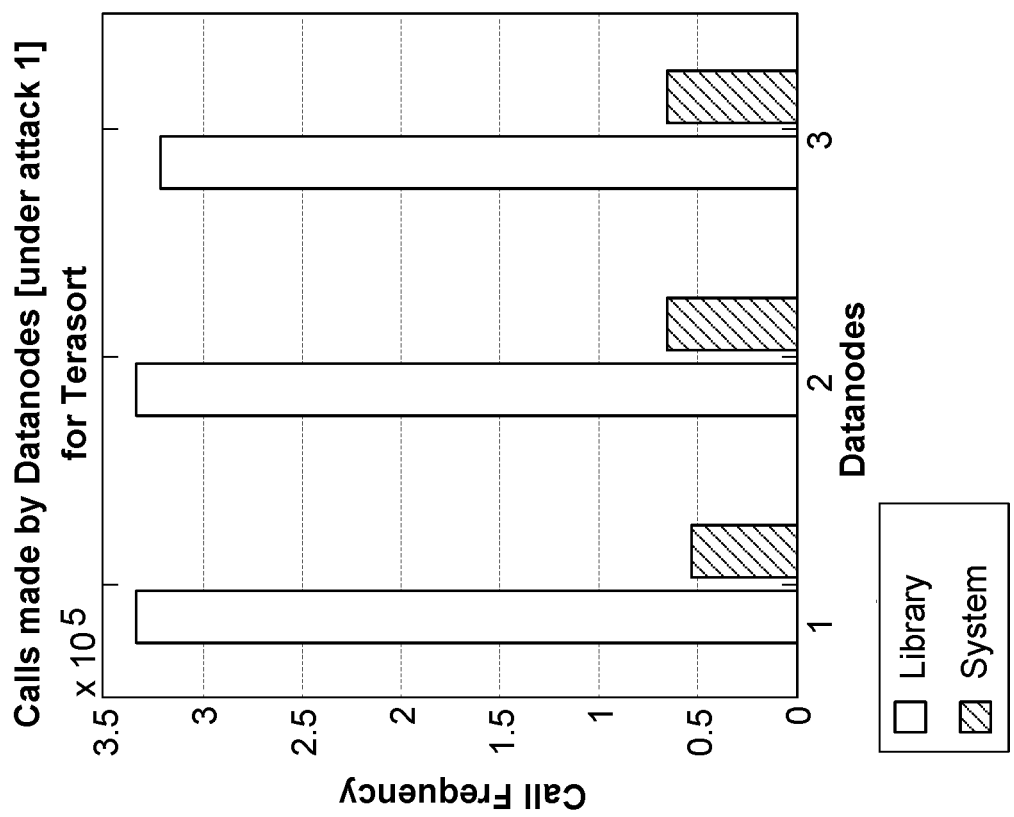
Figures 8C, 8D:
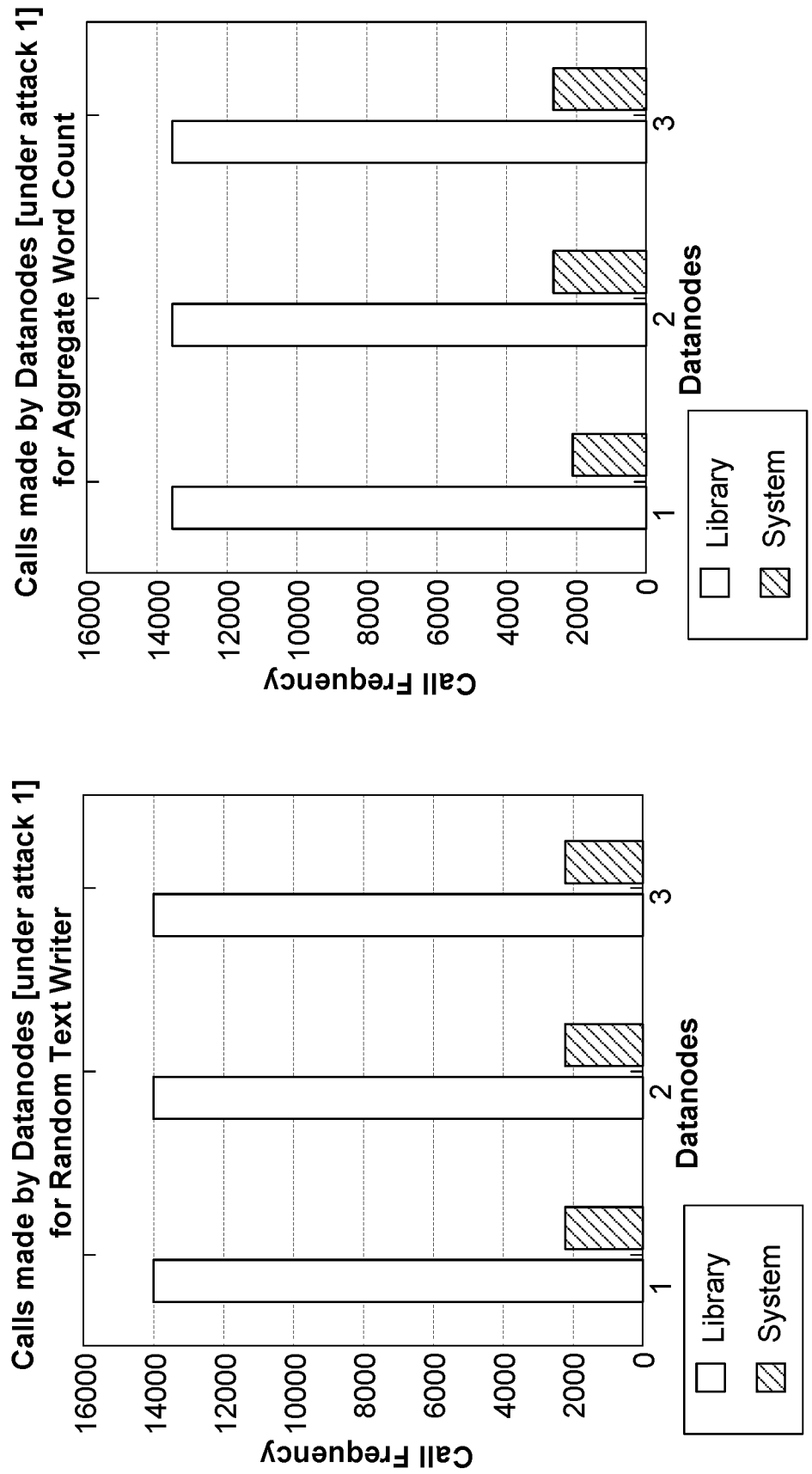

In all four examples, the p-value is extremely 750 low and indicates strong rejection of the null hypothesis that the means of the three different distributions are similar. The multiple comparison test proves that the means of these distributions are not equal and that datanode 1 (in blue) is the one that is different from the other two datanodes (in red). FIGS. 6A-D show the results of ANOVA and FIGS. 7A-D show the results of multiple comparison test. Interestingly, the call frequency on all nodes for these examples seemed to follow similar patterns and the number of distinct library calls made by a datanode is always constant. So if we just consider call frequency analysis for threat detection, this attack is an example of false positive. But it is the system call frequency that hints at the possibility of an attack. Since the memory size and the number of threads for datanode1 were reduced and compared to the other two datanodes, it can be noticed that the system calls (calls to the stack) are relatively low for datanode1 in all examples. This can be observed in FIG. 8.

Figures 9A, 9B:
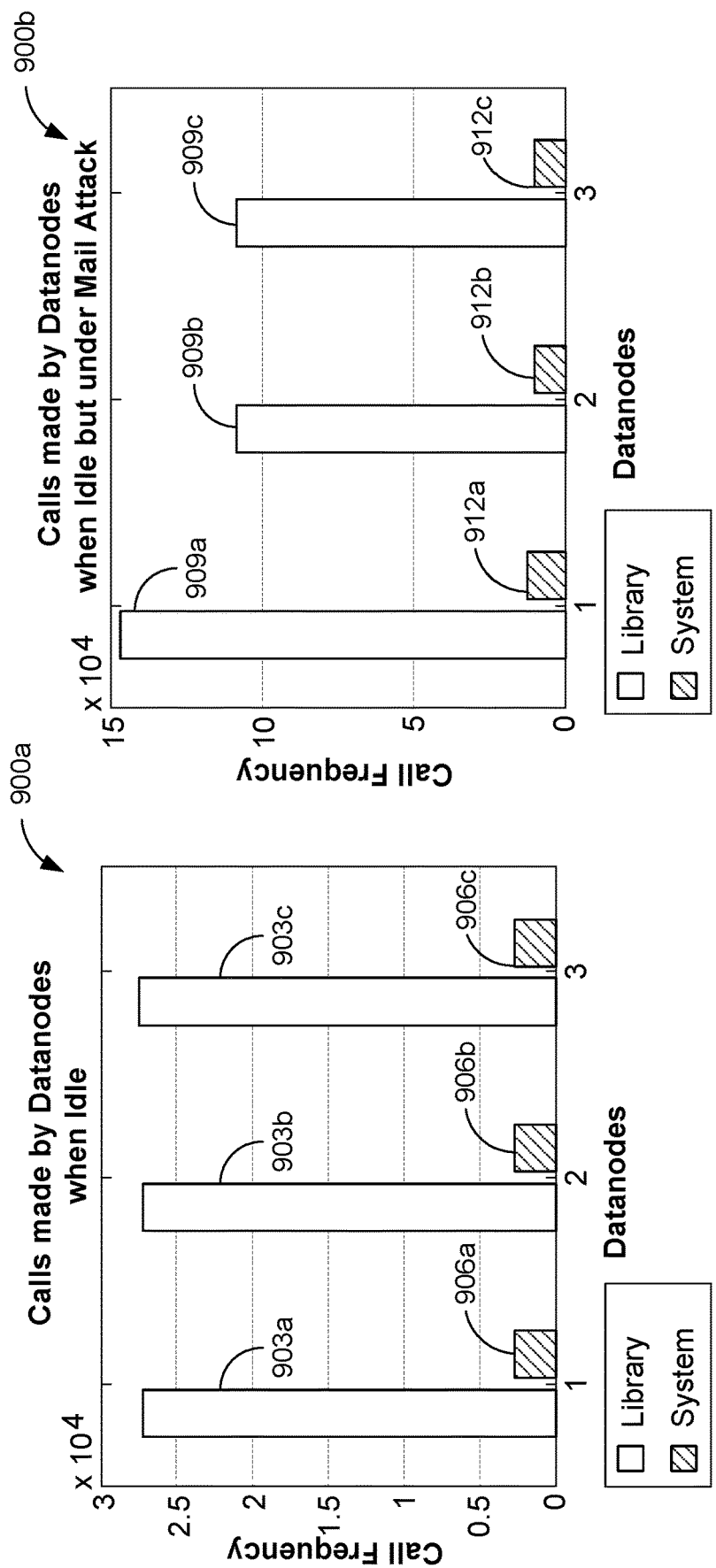
FIGS. 9A and B illustrate differences in calls of datanodes for (A) calls made when cluster is idle and (B) calls made when cluster is idle but with mail attack in the background according to various example embodiments.

Attack 2 Results (Illicit copying of data): Since our test setup uses Amazon EC2, we cannot use a USB drive to copy files. Instead we tried to access data from the /dev folder because all nodes in the cluster are running on Linux operating system. It must be noted that for this kind of attack, it is not required to perform an action (run an example) to notice that the system has been compromised. Hence, this analysis is performed when the system is idle. A script used for encrypting and sending files in RAM disks as mail attachments to system admin's personal email account. Each file is 4 MB in size and it is zipped before sending out as mail attachment. This leads to a difference in the call frequency pattern of the datanode, as observed in FIG. 9. It can be observed from the call frequency in FIGS. 9A and 9B that compromised datanode i.e. datanode1's call frequency is order of magnitude more when compared to datenode2 and datanode3 which were not compromised.

For example, the charts 900*a* and 900*b* show system and library calls from three datanodes, such as, for example, datanodes 303*a-c*. The chart 900*a* corresponds to the datanodes while not under attack, while the chart 900*b* corresponds to the datanodes while under attack. In chart 900*a*, the library calls 903*a-c* and system calls 906*a-c* are consistent across the different datanodes. In contrast, in chart 900*b*, the library call 909*a* varies from library calls 909*b* and 909*c* and system call 912*a* varies from system calls 912*b* and 912*c* because of an attack.

The time complexity of PCA is $O(p2n+p3)$ where n is the number of observations and p is the number of variables in the original dataset. In our case, p=3 and even if we generalize, the value of p will be some constant k because it represents the number of features in memory to be observed. Also, this constant k will be much smaller than n. So, the time complexity of PCA in our case should be approximately $O(n)$ i.e., linearly dependent on the number of observations made. In case of memory pattern analysis, if the tails in the observed populations have considerably larger values compared to the mean of the non-tail data, then those data points will have an impact on the output of variance analysis tests such as ANOVA. Hence, it is important to first filter out such data points before running the analysis test. In case of call analysis, there cannot be a concrete conclusion about the system being attacked based only on frequency of calls obtained from different datanodes. Hence, a combination of both of these methods along with other traditional security methods can be used to keep the system safe. Intrusion detection methods need to account for the following: (1) True Positive: successful identification of anomalous or malicious behavior—our framework achieves this for all data attacks because accessing data involves memory allocation or reference; (2) True Negative: successful identify cation of normal or expected behavior—our framework achieved this when tested on idle datanodes; and (3) False Positive: normal or expected behavior is identified as anomalous or malicious—our framework will have this problem if the memory mapping observations are not properly cleaned (as mentioned above). A false positive in our framework might also occur when there is a delay in the communication among datanodes about the profile. (4) False Negative: anomalous or malicious behavior should have been identified but the framework could not. This case arises if all duplicate datanodes in the big data cluster are attacked by an insider at once. Luckily, this is highly unlikely to happen in case of large, distributed big data clusters. Other traditional security mechanisms in place will be able to prevent such cases from happening.

In this disclosure, a technique can be used to mitigate vulnerabilities and detect attacks during runtime within big data platforms. The technique can include analyzing system & library calls along with memory accesses of a process, packing all of the analysis information together as a process behavior profile, and sharing that profile with other replica datanodes in the system. The replica datanodes can verify the received call traces and access patterns with their local processes for attack detection. Experimental results show that our approach can detect insider attacks even in cases where the usual CPU and network analysis fail to do so, when tested on Hadoop MapReduce examples.

Among embodiments, some aspects of the present disclosure are implemented by a computer program executed by one or more processors, as described and illustrated. As would be apparent to one having ordinary skill in the art, the present disclosure may be implemented, at least in part, by computer-readable instructions in various forms, and the present disclosure is not intended to be limiting to a particular set or sequence of instructions executed by the processor.

The embodiments described herein are not limited in application to the details set forth in the following description or illustrated in the drawings. The present disclosure is capable of other embodiments and of being practiced or carried out in various ways. Also, the phraseology and terminology used herein is for the purpose of description and should not be regarded as limiting. The use of "including," "comprising," or "having" and variations thereof herein is meant to encompass the items listed thereafter, additional items, and equivalents thereof. The terms "connected" and "coupled" are used broadly and encompass both direct and indirect connections and couplings. In addition, the terms "connected" and "coupled" are not limited to electrical, physical, or mechanical connections or couplings. As used herein the terms "machine," "computer," "server," and "work station" are not limited to a device with a single processor, but may encompass multiple devices (e.g., computers) linked in a system, devices with multiple processors, special purpose devices, devices with various peripherals and input and output devices, software acting as a computer or server, and combinations of the above.

Figure 10:
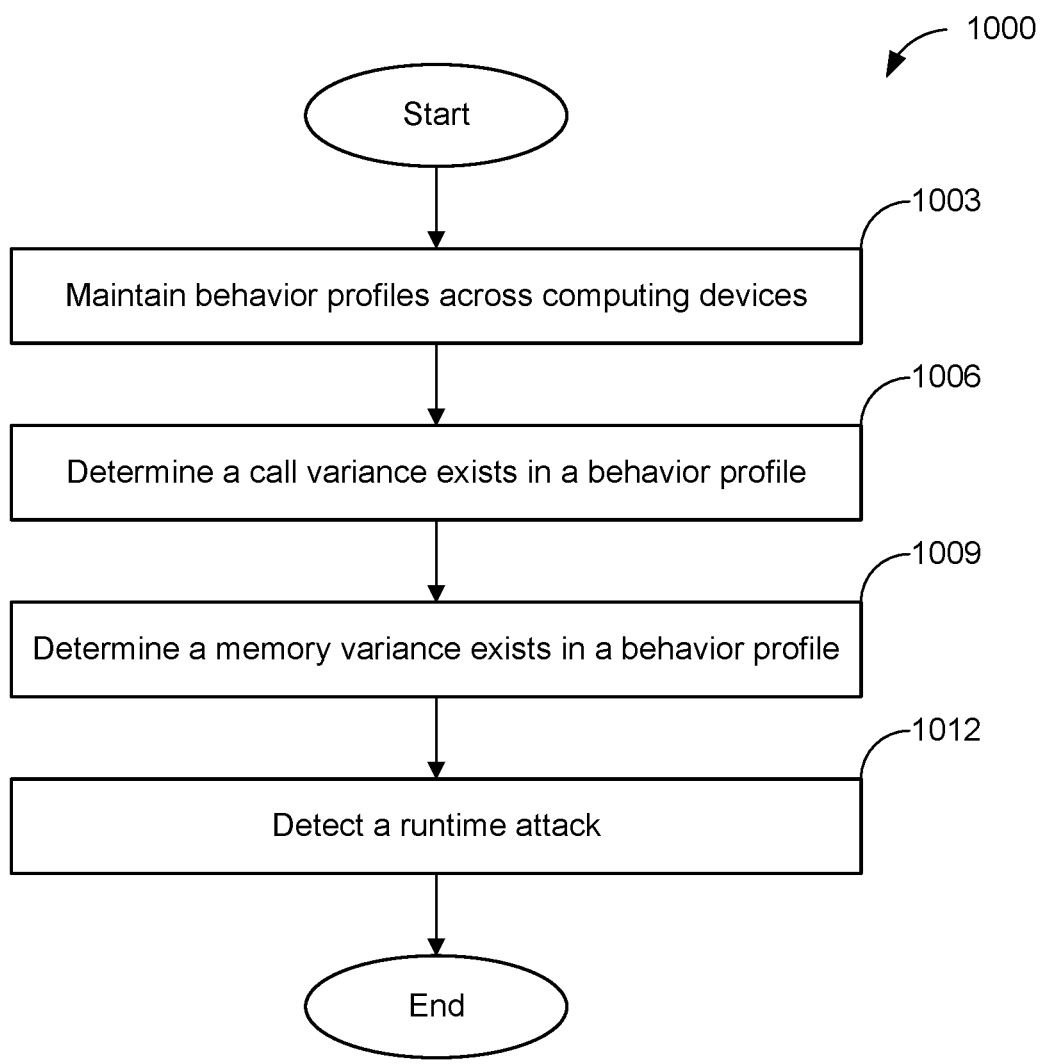
FIG. 10 illustrates an example flowchart of certain functionality implemented by portions of the security framework of FIG. 3 according to various example embodiments.

Referring next to FIG. 10, shown is a flowchart that provides one example of the operation of a process 1000 according to various embodiments. It is understood that the flowchart of FIG. 10 provides merely an example of the many different types of functional arrangements that may be employed to implement the operation of the portion of the security framework as described herein. As an alternative, the flowchart of FIG. 10 may be viewed as depicting an example of elements of a method implemented in the security framework 300 (FIG. 3) according to one or more embodiments.

At box 1003, the process 1000 includes maintaining behavior profiles across one or more computing devices. In some embodiments, each of the datanodes 306a-c in a security framework 300 can maintain a respective behavior profile locally. In other embodiments, the datanotes 306b-c can send behavior data to the primary datanode 306a, such that the primary datanode 306a can maintain the behavior profiles for each of the datanodes 306a-c. The behavior profile can include a frequency of calls to system and library functions. The behavior profile can include a memory footprint for one or more tasks or processes executed in each datanode 306a-c. The memory footprint can include patterns in memory access including general memory consumption data, sizes of resident pages in mappings, sizes of shared pages in the mappings, sizes of private pages in the mappings, and potential other memory aspects.

At box 1006, the process 1000 includes determining that a call variance exists in a behavior profile. One of the datanodes 306a-c can determine that a variance exists in calls for one or more of the behavior profiles. As one example, one of the datanodes 306a-c could determine a call variance exists by comparing the library call frequencies 909a-c to determine that the library call frequency 909a exceeds the library call frequencies 909b and 909c. Similarly, the system call frequencies can be compared in FIGS. 8A-8D and 9A-9B to determine a variance exists.

At box 1009, the process 1000 includes determining that a memory variance exists in a behavior profile. One of the datanodes 306a-c can determine a variance exists in one or more behavior profile by obtaining a memory footprint from each of datanodes by observing pages referenced by processes on the datanode and determining a memory consumption of the memory footprint of the process. The memory consumptions for each of the datanodes 306a-c can be compared to determine if one of the memory consumptions differs from the others. If the memory consumption differs, a memory variance exists in the behavior profile.

Similarly, the memory data from the processes can be normalized such that statistical analysis can be performed on the normalized data. The statistical parameters for each datanode 306a-c can be compared to see if a variance exists. As an example, a variance can be determined if a standard deviation of memory data for one of the processes varies from the other processes. In some embodiments, the variance can be detected when a pre-defined threshold of variance is detected.

At box 1012, the process 1000 includes detecting a runtime attack occurred. One of the datanodes 306a-c can detect that a runtime attack occurred based at least in part on a call variance and a memory variance existing. The runtime attack can correspond to an authorized user committing a malicious act on one of the datanodes 306a-c, such as, for example, altering code running on one of the datanodes 306a-c, installing or injecting malicious code on one of the datanodes 306a-c, or altering data stored on the datanode 306a-c. When malicious code is executed on only one of the datanodes 306a-c, the malicious code will cause different call and memory patterns to occur when compared to the other datanodes 306a-c. Similarly, if data stored on one of the datanodes 306a-c is altered, when the datanodes 306a-c access the altered data, the datanode containing the altered data will have a variance in call and memory patterns.

When a runtime attack is detected, a remedial action can be taken. For example, a primary datanode 306a can send a notification to the master node 303, referred to as a namenode. In some embodiments, the master node 303 can perform the remedial action. The remedial action can include shutting down the datanodes 306a-c, shutting down only the infected datanode 306a-c, preventing future tasks from being assigned to the datanodes 306a-c, alerting an administrator, or some other remedial action. Shutting down a datanode can include preventing network access from the datanode, suspending the datanode, forcing a software shutdown, forcing a hardware shutdown, causing a power disconnect for the datanode, or some other shutdown.

Before shutting down, forensic information can be captured. For example, a snapshot of the current state of the datanode can be captured. The snapshot can be loaded within a sandbox environment to facilitate identifying the source of the attack and target of the attack. The sandbox environment can allow malicious code to run without damaging any system, such that the intended behavior of the malicious code can be determined.

Figure 11:
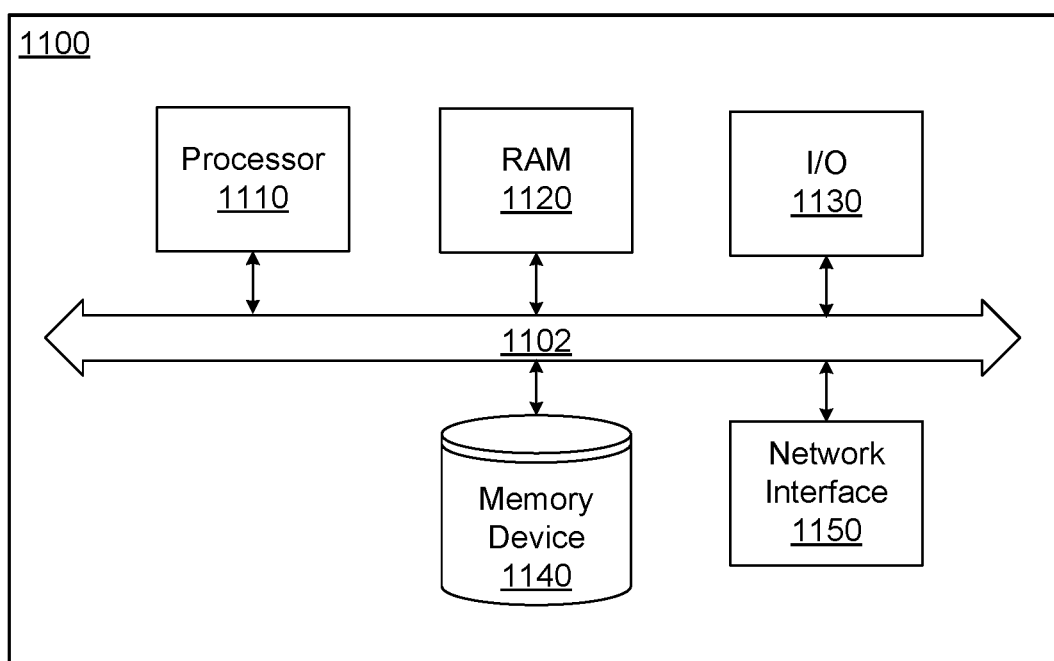
FIG. 11 is a schematic block diagram that illustrates an example computing environment employed in the security framework of FIG. 3 according to various example embodiments.

Turning to FIG. 11, an example hardware diagram of a general purpose computer 1110 is illustrated. Any of the processed, techniques, and methods discussed herein may be implemented, in part, using one or more elements of the general purpose computer 1100. The computer 1100 includes a processor 1110, a Random Access Memory ("RAM")/a Read Only Memory ("ROM") 1120, an Input Output ("I/O") interface 1130, a memory device 1140, and a network interface 1150. The elements of the computer 1100 are communicatively coupled via a bus 1102.

The processor 1110 comprises any well known general purpose arithmetic processor or Application Specific Integrated Circuit ("ASIC"). The RAM and ROM 1120 and 1130 comprise any well known random access or read only memory device that stores computer-readable instructions to be executed by the processor 1110. The memory device 1130 stores computer-readable instructions thereon that, when executed by the processor 1110, direct the processor 1110 to execute various aspects of the present disclosure described herein. When the processor 1110 comprises an ASIC, the processes described herein may be executed by the ASIC according to an embedded circuitry design of the ASIC, by firmware of the ASIC, or both an embedded circuitry design and firmware of the ASIC. As a non-limiting example group, the memory device 1130 comprises one or more of an optical disc, a magnetic disc, a semiconductor memory (i.e., a semiconductor, floating gate, or similar flash based memory), a magnetic tape memory, a removable memory, combinations thereof, or any other known memory means for storing computer-readable instructions. The network interface 1150 comprises hardware interfaces to communicate over data networks. The I/O interface 1130 comprises device input and output interfaces such as keyboard, pointing device, display, communication, and other interfaces. The bus 1102 electrically and communicatively couples the processor 1110, the RAM 1120, the ROM 1130, the memory device 1140, the network interface 1150, and the I/O interface 1060, so that data and instructions may be communicated among them.

In operation, the processor 1110 is configured to retrieve computer-readable instructions stored on the memory device 1140, the RAM 1120, the ROM 1130, or another storage means, and copy the computer-readable instructions to the RAM 1120 or the ROM 1130 for execution, for example. The processor 1110 is further configured to execute the computer-readable instructions to implement various aspects and features of the present disclosure. For example, the processor 1110 may be adapted and configured to execute the processes described above, including the processes described as being performed as part of an intrusion detection technique. Also, the memory device 1140 may store the data stored in a database.

A phrase, such as "at least one of X, Y, or Z," unless specifically stated otherwise, is to be understood with the context as used in general to present that an item, term, etc., can be either X, Y, or Z, or any combination thereof (e.g., X, Y, and/or Z). Similarly, "at least one of X, Y, and Z," unless specifically stated otherwise, is to be understood to present that an item, term, etc., can be either X, Y, and Z, or any combination thereof (e.g., X, Y, and/or Z). Thus, as used herein, such phrases are not generally intended to, and should not, imply that certain embodiments require at least one of either X, Y, or Z to be present, but not, for example, one X and one Y. Further, such phrases should not imply that certain embodiments require each of at least one of X, at least one of Y, and at least one of Z to be present.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present disclosure defined in the following claims, the scope of which are to be accorded the broadest interpretation so as to encompass modifications and equivalent structures.

Therefore, at least the following is claimed:

1. A method comprising:
    maintaining a plurality of behavior profiles individually corresponding to a respective one of a plurality of tasks, the plurality of tasks individually executed on a respective one of a plurality of computing devices, wherein the behavior profiles comprise a plurality of sequences representing a plurality of sizes of private and shared memory accesses during an execution of the respective one of the plurality of tasks;
    determining that a call variance exists in a trace of one of the plurality of behavior profiles;
    determining that a memory variance exists in a sequence of the plurality of sequences of the one of the plurality of behavior profiles; and
    in response to determining that the call variance and the memory variance exist, detecting a runtime attack.

2. The method of claim 1, wherein determining that the call variance exists comprises:
    determining a respective call frequency for each of a plurality of system calls from each of the plurality of tasks; and
    comparing the respective call frequency for each of the plurality of system calls to each other.

3. The method of claim 1, wherein determining that the memory variance exists comprises:
    normalizing the plurality of sizes of private and shared memory accesses from each of the plurality of tasks; and
    performing statistical analysis on the normalized memory data.

4. The method of claim 1, further comprising:
    obtaining a memory footprint of a process corresponding to one of the plurality of tasks by observing a number of pages referenced by the process; and
    determining a memory consumption of the memory footprint of the process.

5. The method of claim 1, further comprising determining a memory access pattern, the memory access pattern comprising information about a plurality of features of a memory access of a process including a size of resident pages in a mapping, a size of shared pages in the mapping, and a size of private pages in the mapping.

6. The method of claim 1, wherein the plurality of tasks correspond to a respective process executing a single software application and the plurality of tasks differ from one another by which respective computing device of the plurality of computing devices each respective process is being executed on.

7. The method of claim 1, wherein the runtime attack is based at least in part on an improper use of a system.

8. The method of claim 1, wherein a respective architecture, a respective operating system, and a respective page size for each of the plurality of computing devices are the same.

9. The method of claim 1, wherein a path to an installation of a framework is the same for each of the plurality of computing devices.

10. The method of claim 1, wherein the plurality of computing devices comprises a plurality of datanodes and a namenode.

11. The method of claim 10, wherein a communication cost between each of the plurality of datanodes is less than or equal to a communication cost between the namenode and the plurality of datanodes.

12. A system comprising:
    a data store; and
    a plurality of computing devices executing a plurality of processes, wherein at least one of the plurality of computing devices is configured to at least:
        maintain a plurality of behavior profiles individually corresponding to a respective one of the plurality of processes, wherein the behavior profiles comprise a plurality of sequences representing a plurality of sizes of private and shared memory accesses during an execution of the respective one of the plurality of processes;

determine that a call variance exists in a trace of one of the plurality of behavior profiles;

determine that a memory variance exists in a sequence of the plurality of sequences of the one of the plurality of behavior profiles; and in response to determining that the call variance and the memory variance exist, detect a runtime attack.

13. The system of claim 12, wherein the at least one of the plurality of computing devices is further configured to at least:

determining a respective call frequency for each of a plurality of system calls from each of the plurality of processes; and comparing the respective call frequency for each of the plurality of system calls to each other.

14. The system of claim 12, wherein the at least one of the plurality of computing devices is further configured to at least:

normalize the plurality of sizes of private and shared memory accesses from each of the plurality of processes; and perform statistical analysis on the normalized memory data.

15. The system of claim 12, wherein the at least one of the plurality of computing devices is further configured to at least:

obtain a memory footprint of a one of the plurality of processes by observing a number of pages referenced by the one of the plurality of processes; and determine a memory consumption of the memory footprint of the one of the plurality of processes.

16. The system of claim 12, wherein the at least one of the plurality of computing devices is further configured to at least determine a memory access pattern, the memory access pattern comprising information about a plurality of features of a process memory access including a size of resident pages in a mapping, a size of shared pages in the mapping, and a size of private pages in the mapping.

17. The system of claim 12, wherein each of the plurality of processes correspond to a single software application and the plurality of processes differ from one another by which respective computing device of the plurality of computing devices each of the plurality of processes is being executed on.

18. The system of claim 12, wherein the plurality of computing devices comprise a plurality of datanodes and a namenode.

19. The system of claim 18, wherein a communication cost between each of the plurality of datanodes is less than or equal to a communication cost between the namenode and the plurality of datanodes.

20. The system of claim 18, wherein the plurality of computing devices comprises a plurality of datanodes and a namenode, the plurality of datanodes comprising a primary datanode and the at least one of the plurality of computing devices is further configured to at least send an attack notification from the primary datanode to the namenode in response to detecting the runtime attack.

* * * * *